(12) United States Patent
Taniuchi

(10) Patent No.: US 11,703,973 B2
(45) Date of Patent: Jul. 18, 2023

(54) INPUT APPARATUS AND ELECTRONIC DEVICE APPLYING THE SAME

(71) Applicant: GOERTEK TECHNOLOGY CO., LTD., Qingdao (CN)

(72) Inventor: Hirotada Taniuchi, Qingdao (CN)

(73) Assignee: GOERTEK TECHNOLOGY CO. LTD., Qingdao (CN)

( * ) Notice: Subject to any disclaimer, the term of this patent is extended or adjusted under 35 U.S.C. 154(b) by 389 days.

(21) Appl. No.: 17/043,213

(22) PCT Filed: Dec. 30, 2019

(86) PCT No.: PCT/CN2019/129857
§ 371 (c)(1),
(2) Date: Sep. 29, 2020

(87) PCT Pub. No.: WO2021/134181
PCT Pub. Date: Jul. 8, 2021

(65) Prior Publication Data
US 2022/0300105 A1  Sep. 22, 2022

(51) Int. Cl.
*G06F 3/041* (2006.01)

(52) U.S. Cl.
CPC .................. *G06F 3/0416* (2013.01)

(58) Field of Classification Search
CPC ...... G06F 3/011; G06F 3/0416; H02M 3/156; H02M 3/157; H02M 7/217; H03F 3/217; H03F 3/2173; H03F 3/45475
See application file for complete search history.

(56) References Cited

U.S. PATENT DOCUMENTS

| 2010/0156852 A1 | 6/2010 | Chu et al. |
| 2011/0096945 A1* | 4/2011 | Furst ............... H04R 19/04 381/120 |

(Continued)

FOREIGN PATENT DOCUMENTS

| CN | 102435234 A | 5/2012 |
| CN | 103516318 A | 1/2014 |

(Continued)

OTHER PUBLICATIONS

China Patent Office Search Authority, English Translation of International Search Report and Written Opinion for PCT/CN2019/129857 filed Dec. 30, 2019, dated Sep. 28, 2020.

(Continued)

*Primary Examiner* — Ryan A Lubit
(74) *Attorney, Agent, or Firm* — Workman Nydegger

(57) ABSTRACT

An input apparatus and an electronic device applying the input apparatus. The input apparatus includes: at least one sensor, configured to detect an inputting operation, and output a first signal based on the inputting operation; at least one amplifying circuit, configured to amplify a difference between the first signal and a referential signal, to output a second signal, where each of the at least one amplifying circuit comprises a plurality of stages, each of the plurality stages comprises an amplifier, and a high-pass filter is connected between last two stages of the plurality of stages; and an analog-digital converter, configured to convert the second signal into a digital signal characterizing a state of the inputting operation, where the ADC comprises at least one comparator. Users can give instructions through novel inputting operations, and performances of the electronic device are greatly improved.

19 Claims, 13 Drawing Sheets

(56) References Cited

U.S. PATENT DOCUMENTS

| | | | |
|---|---|---|---|
| 2012/0062204 A1* | 3/2012 | Draxelmayr | H02M 3/156 323/318 |
| 2012/0126761 A1* | 5/2012 | Tuten | H02M 3/157 327/427 |
| 2014/0003482 A1 | 1/2014 | Hwang | |
| 2014/0160088 A1 | 6/2014 | Mercea et al. | |
| 2015/0229300 A1 | 8/2015 | Hwang | |
| 2015/0323944 A1 | 11/2015 | Youssef et al. | |
| 2016/0147333 A1* | 5/2016 | Levesque | H04M 1/0268 345/161 |
| 2017/0010130 A1* | 1/2017 | Xu | G06F 3/014 |
| 2017/0115676 A1* | 4/2017 | Yazdi | G05D 23/24 |
| 2018/0063457 A1 | 3/2018 | Shimamura et al. | |
| 2018/0301140 A1* | 10/2018 | Turcott | G06N 3/044 |
| 2019/0286263 A1* | 9/2019 | Bagheri | G06F 3/0414 |
| 2019/0356289 A1 | 11/2019 | Cho et al. | |
| 2020/0241664 A1* | 7/2020 | Lee | G06F 3/0416 |

FOREIGN PATENT DOCUMENTS

| | | |
|---|---|---|
| CN | 105094197 A | 11/2015 |
| CN | 107014444 A | 8/2017 |
| CN | 207475728 U | 6/2018 |
| CN | 110492858 A | 11/2019 |

OTHER PUBLICATIONS

Chinese Office Action, dated Jun. 21, 2022, from Chinese Patent Application No. 201980064062.X.

* cited by examiner

INPUT APPARATUS AND ELECTRONIC DEVICE APPLYING THE SAME

TECHNICAL FIELD

The present disclosure relates to the technical field of human-computer interaction, and in particular, to an input apparatus and an electronic device applying the input apparatus.

BACKGROUND

Recent decades have witnessed fast development of various electronic devices in people's daily life. In order to facilitate utilization of the electronic devices, lots of input apparatuses are developed to help users interact with the electronic device. For example, a mobile phone or a household appliance generally includes a touch panel and physical buttons. Users can input instructions to the mobile phone by touching the touch panel or pressing the physical buttons.

In conventional technologies, input apparatuses for the electronic devices can recognize a limited number of inputting operations. A conventional touch panel can at best recognize a tap, a long press or a swipe performed by a finger of the user. A conventional physical button can at best recognize a rapid press or a long press. Such limited inputting operations cannot meet a requirement of fast-developing functions of the electronic devices. Input apparatuses for new types of inputting operations are in urgent need to allow users to give various instructions with simple operations.

SUMMARY

An input apparatus and an electronic device applying the input apparatus are provided according to embodiments of the present disclosure. Accordingly, users are able to instruct an electronic device through new types of simple inputting operations.

In a first aspect, an input apparatus is provided. The input apparatus is applied to an electronic device. The input apparatus includes at least one sensor, configured to detect an inputting operation, and output a first signal based on the inputting operation. The input apparatus includes at least one amplifying circuit, configured to amplify a difference between the first signal and a referential signal to output a second signal, where each of the at least one amplifying circuit comprises multiple stages, each of the multiple stages comprises an amplifier, and a high-pass filter is connected between last two stages of the multiple stages. The input apparatus includes an analog-digital converter (ADC), configured to convert the second signal into a digital signal characterizing a state of the inputting operation, where the ADC comprises at least one comparator.

The inputting operation includes deformation of a part of a housing of the electronic device.

The state of the inputting operation includes the part of the housing being stretched or being squeezed.

The at least one sensor includes a strain gauge and a first resistor that are connected in series, and the first signal is a voltage at a common node between the strain gauge and the first resistor.

The high-pass filter includes a second resistor and a first capacitor that are connected in series.

A last stage of the multiple stages includes a first branch that has a variable resistance. The first branch is connected between an output terminal of the amplifier of the last stage and an inverting input terminal of the amplifier of the last stage.

The first branch includes a third resistor and a second branch that are connected in parallel, and the second branch includes a fourth resistor and a first switch that are connected in series.

The at least one comparator includes at least one first comparator or at least one second comparator. For each of the at least one first comparator, an output signal of said first comparator is active in response to the second signal sent into said first comparator being larger than a reference for said first comparator. For each of the at least one second comparator, an output signal of said second comparator is active in response to the second signal sent into said second comparator being smaller than a reference for said second comparator.

The digital signal includes the output signal of each of the at least one first comparator or the output signal of each of the at least one second comparator.

The input apparatus further comprises a logic circuit. The at least one comparator includes the at least one first comparator and the at least one second comparator. The at least one first comparator includes a primary first comparator, and the at least second comparator includes a primary second comparator. The output signal of the primary first comparator is coupled to a first input terminal of the logic circuit, and is coupled via a first delay to a second input terminal of the logic circuit. The output signal of the primary second comparator is coupled to a third input terminal of the logic circuit, and is coupled via a second delay to a fourth input terminal of the logic circuit. An output signal of the first delay is kept active for a first period in response to the output signal of the primary first comparator being active, and an output signal of the second delay is kept active for a second period in response to the output signal of the primary second comparator being active. The output signal of the first delay is forced inactive in response to the output signal of the second delay being active, and the output signal of the second delay is forced inactive in response to the output signal of the first delay being active. Each of at least one output signal of the logic circuit is triggered to be active within the first period in response to the output signal of the primary first comparator turning active, or triggered to be active within the second period in response to the output signal of the primary second comparator turning active. The digital signal includes the at least one output signal of the logic circuit, or the digital signal is generated from the at least one output signal of the logic circuit.

The input apparatus further includes a logic circuit. The at least one comparator includes the at least one first comparator and the at least one second comparator. The at least one first comparator includes a primary first comparator and an auxiliary first comparator, and the at least second comparator includes a primary second comparator and an auxiliary second comparator. The output signal of the primary first comparator is coupled via a first delay to a first input terminal of the logic circuit, the output signal of the primary second comparator is coupled via a second delay to a second input terminal of the logic circuit, the output signal of the auxiliary first comparator is coupled to a first input terminal of the logic circuit, and the output signal of the auxiliary second comparator is coupled to a fourth input terminal of the logic circuit. An output signal of the first delay is kept active for a first period in response to the output signal of the primary first comparator being active, and an output signal of the second delay is kept active for a second period in response to the output signal of the primary second comparator being active. The output signal of the first delay is forced inactive in response to the output signal of the second delay being active, and the output signal of the second delay is forced inactive in response to the output signal of the first delay being active. Each of at least one output signal of the logic circuit is triggered to be active within the first period in response to the output signal of the primary first comparator turning active, or triggered to be active within the second period in response to the output signal of the primary second comparator turning active. The digital signal comprises the at least one output signal of the logic circuit, or the digital signal is generated from the at least one output signal of the logic circuit.

The references for the primary first comparator and the auxiliary first comparator are different, or the references for the primary second comparator and the auxiliary second comparator are different.

The logic circuit outputs the at least one output signal that comprises a first output signal and a second output signal. The first output signal is triggered to be active within the first period in response to the output signal of the primary first comparator turning active, and the second output signal is triggered to be active within the second period in response to the output signal of the primary second comparator turning active. The digital signal includes the first output signal and the second output signal.

The first output signal is active in response to the output signal of the primary first comparator being active, and the second output signal is active in response to the output signal of the primary second comparator being active. Or, the first output signal is active in response to the output signal of the primary second comparator being active within the first period after the output signal of the primary first comparator being active, and the second output signal is active in response to the output signal of the primary first comparator being active within the second period after the primary second comparator being active. Or, the first output signal is active in response the output signal of the first delay being active, and is inactive in response to the output signal of the first delay being inactive or the output signal of the primary second comparator being active; and the second output signal is active in response to the output signal of the second delay being active, and is inactive in response to the output signal of the second delay being inactive or the output signal of the primary first comparator being active.

The digital signal further includes the output signal of a comparator other than the primary first comparator and the primary second comparator among the at least one comparator.

The ADC further includes an analog-digital converting unit. The analog-digital converting unit generates the digital signal, based on the at least one output signal of the logic circuit and the second signal. The digital signal includes an output signal of the analog-digital converting unit.

A quantity of the at least one first comparator is more than one, and the reference for the at least one first comparator are different. Or, a quantity of the at least one second comparator is more than one, and the references for the at least one second comparator are different.

A quantity of the at least one sensor is N, a quantity of the at least one amplifying circuit is N, a quantity of the at least one first comparator is N, a quantity of the at least one second comparator is N, and N is an integer greater than. The ADC further includes $2^{N-1}$ delays, where others of the $2^{N-1}$ delays is inactive in response to any of the $2^{N-1}$ delays being active. The ADC further includes a first logic circuit and a second logic circuit, the first logic circuit includes N pairs of first input terminals and $2^N$ first output terminals, and the second logic circuit includes $2^{N-1}$ triples of second input terminals and multiple second output terminals. There is a one-to-one correspondence between the N sensors and the N amplifying circuits, between the N amplifying circuits and the N first comparators, between the N amplifying circuits and the N second comparators, and between the N amplifying circuits and the N pairs of first input terminals. For each of the N amplifying circuits, the first signal outputted by the corresponding sensor is amplified, said first signal is coupled to the corresponding first comparator and the corresponding second comparator, and the output signal of said first comparator is coupled to one first input terminal in the corresponding pair of the first input terminals, and the output signal of said second comparator is coupled to another first input terminal in the corresponding pair of the first input terminals. For each of the $2^N$ first output terminals, an output signal of said first output terminal is active in response to signals at a combination of N of the first input terminals being active, each of the N first input terminals belongs to a different one of N pairs of the first input terminals, and the combinations for the $2^N$ first output terminals are different from each other. The $2^N$ first output terminals is divided into $2^{N-1}$ pairs of first output terminals, where in each pair of first output terminals, the two combinations for said pair of first output terminals include every first input terminal of the N pairs of first input terminals. There is a one-to-one correspondence between the $2^{N-1}$ pairs of first output terminals and the $2^{N-1}$ delays, and between the $2^{N-1}$ pairs of first output terminals and the $2^{N-1}$ triples of second input terminals. For each of the $2^{N-1}$ pairs of first output terminals, one of said pair of first output terminal is coupled to one second input terminal in the corresponding triple of second input terminals, the one of said pair of first output terminal is coupled via the corresponding delay to another second input terminal in the corresponding triple of second input terminals, another of said pair of first output terminals is coupled to yet another second input terminal in the corresponding triple of second input terminals, and an output signal of the corresponding delay is active for a period in response to the output signal of the one of said pairs of first output terminal being active. For each of the multiple second output terminals, an output signal of said second output terminal is triggered to be active within the period in response to an output signal from one or more of the $2^N$ first output terminals turning active. The digital signal includes the output signals of the plurality of second output terminals, or the digital signal is generated from the output signals of the plurality of second output terminals.

The at least one sensor includes a first sensor and a second senor, the at least one amplifying circuit includes a first amplifying circuit and a second amplifying circuit, the at least one first comparator includes a primary first comparator and an auxiliary first comparator, and the at least one second comparator includes a primary second comparator and an auxiliary second comparator. The first sensor outputs a first channel of the first signal to the first amplifying circuit, the second sensor outputs a second channel of the first signal to the second amplifying circuit, the first amplifying circuit outputs a first channel of the second signal to the primary first comparator and the primary second comparator, and the second amplifying circuit outputs a second channel of the second signal to the auxiliary first comparator and the auxiliary second comparator. The ADC further includes a first delay and a second delay, wherein the first day is forced inactive in response to the second delay being active, the second delay is forced inactive in response to the first delay being active, an output signal of the first delay is active for a first period in response to an input signal of the first day being active, and an output signal of the second delay is active for a second period in response to an input signal of the second day being active. The ADC further includes a first logic circuit and a second logic circuit, the first logic circuit includes a first input terminal, a second input terminal, a third input terminal, a fourth input terminal, a first output terminal, a second output terminal, a third output terminal, and a fourth output terminal, and the second logic circuit includes a fifth input terminal, a sixth input terminal, a seventh input terminal, an eighth input terminal, a ninth input terminal, a tenth input terminal, and multiple digital output terminals. The output signal of the auxiliary first comparator is coupled to the first input terminal, the output signal of the auxiliary second comparator is coupled to the second input terminal, the output signal of the primary first comparator is coupled to the third input terminal, and the output signal of the primary second comparator is coupled to the fourth input terminal. An output signal of the first output signal is active in response to signals at the first input terminal and the third input terminal being active, an output signal of the second output signal is active in response to signals at the second input terminal and the fourth input terminal being active, an output signal of the third output signal is active in response to signals at the second input terminal and the third input terminal being active, and an output signal of the fourth output signal is active in response to signals at the first input terminal and the fourth input terminal being active. The first output terminal is coupled to the fifth input terminal, the second output terminal is coupled to the sixth input terminal, the third output terminal is coupled to the seventh input terminal, the third output terminal is coupled to the eighth input terminal via the first delay, the fourth output terminal is coupled to the ninth input terminal, and the fourth output terminal is coupled to the tenth input terminal via the second delay. For each of multiple digital output terminals, conditions for triggering an output signal of said second output terminal to be active includes at least one of: an output signal from the first output terminal being active; an output signal from the second output terminal being active; being within the first period after an output signal from the third output terminal turning active; or being within the second period after an output signal from the fourth output terminal turning active. The digital signal includes the output signals of multiple second digital output terminals, or the digital signal is generated from the output signals of multiple second digital output terminals.

The difference is not amplified in response to the difference being smaller than an offset of a first one of the multiple stages.

In a second aspect, an electronic device is provided. The electronic device includes any of the aforementioned input apparatuses and a controller. The controller is configured to recognize the inputting operation from the digital signal, and the digital signal is coupled to an input terminal of the controller.

With the input apparatus and the electronic device according to embodiments of the present disclosure, the inputting operation especially deformation of housing of an electronic device can be detected with a simple circuit. The electronic device with the input apparatus is capable to be controlled via additional operations, such as a grip on the electronic device. The input apparatus has a low cost and a large input range, and is capable to process signals from one or more sensors. Thereby, users can give instructions through novel inputting operations, and performances of the electronic device are greatly improved.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF THE EMBODIMENTS

Hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

Figure 1:
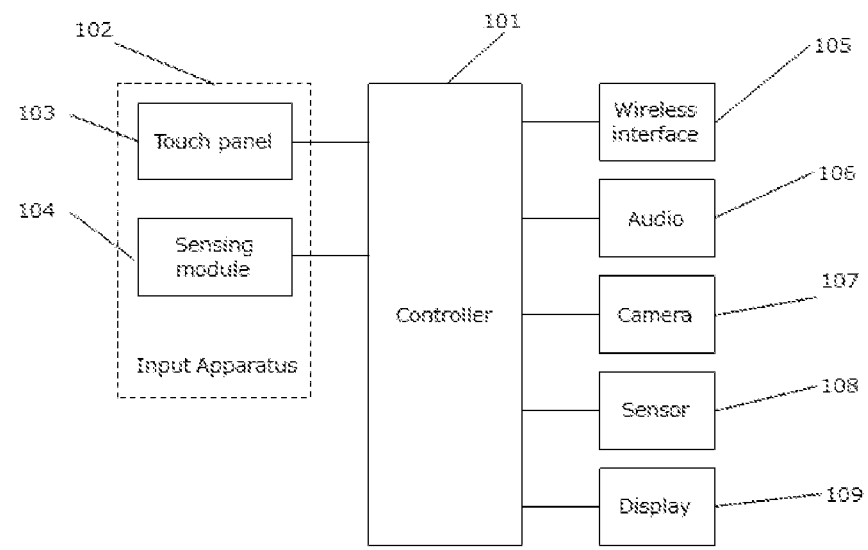
FIG. 1 is a schematic structural diagram of an electronic device according to an embodiment of the present disclosure.

FIG. 1 shows a schematic diagram of an electronic device according to an embodiment of the present disclosure. The electronic device includes a controller 101, an input apparatus 102, and other functional modules. The input apparatus 102 includes a means to collect an inputting operation of a user. In one embodiment as shown in FIG. 1, such means may be a sensing unit that can reflect an operation from a user, such as a touch panel 103 and a sensing module 104. It is appreciated that the input apparatus may include other types of sensing unit on requirement, so as to collect an inputting operation. For example, the sensing may be a tactile switch, a capacitive sensor, an infrared sensor, a temperature sensor, or a pressure sensor. The functional modules may include a wireless interface 105, an audio module 106, a camera 107, a sensor 108, a display 109, and the like. The controller 101 is configured to receive a signal from the input device 102, so as to recognize the inputting operation. As an example, the controller 101 may be configured to recognize a type of the inputting operation, such as a tap, a swipe, a long press, or a grip. In such case, the signal from the input apparatus 102 contains information indicating the type of the inputting operation. In one embodiment, such information may be embodied as a specific sequence of electronic levels in the signal.

Figure 2:
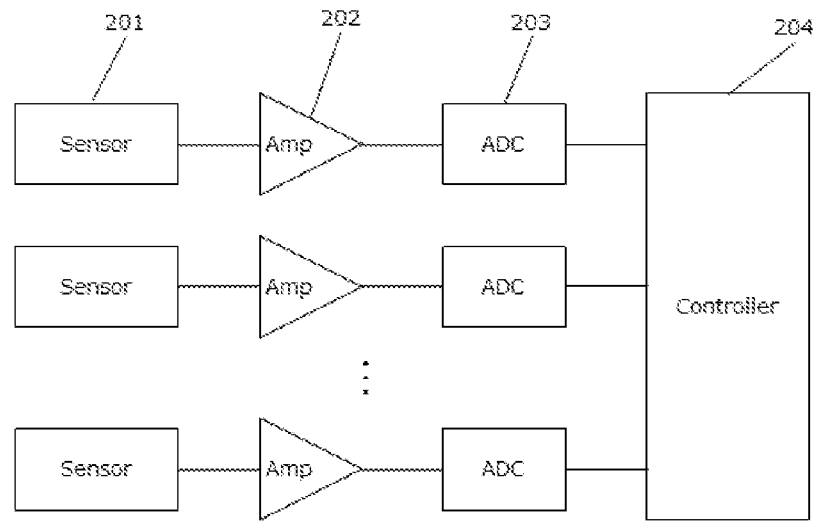
FIG. 2 is a schematic structural diagram of an input apparatus according to an embodiment of the present disclosure.

FIG. 2 shows a schematic structural diagram of an input apparatus according to an embodiment of the present disclosure. The input device may include a sensor 201, an amplifying circuit 202, and an analog-digital converter (ADC) 203.

The sensor 201 is configured to detect an inputting operation, and output a first signal based on the inputting operation. It is appreciated that a manner of such detection and a type of the sensor are based on a type of the inputting operation. For example, the inputting operation is a tap, a swipe, or a long press. A change in capacitance or resistance may be detected, and the sensor may include a capacitive sensor or a touch panel. For another example, the inputting operation is a squeeze or a stretch on a part of housing of the electronic device. Deformation of the housing may be detected, and the sensor may include a pressure sensor, a piezo-resistor, or a strain gauge.

The amplifying circuit 202 is configured to amplify a difference between the first signal and a referential signal, to output a second signal. The ADC 203 is configured to convert the second signal into a digital signal. The digital signal is sent to the controller 204 for recognizing the type of the inputting operation. Since a type of the inputting operation may be characterized by multiple parameters, such as duration, strength, and a direction, the input apparatus may include multiple sensors, multiple amplifying circuits, and multiple ADCs, as shown in FIG. 2. It is noted that FIG. 2 merely shows an example that the sensors, amplifiers and the ADCs are in one-to-one correspondences, and the present disclosure are not limited thereto. One-to-many or many-to-many correspondence is also appropriate as long as the aforementioned functions can be implemented.

Figure 3:
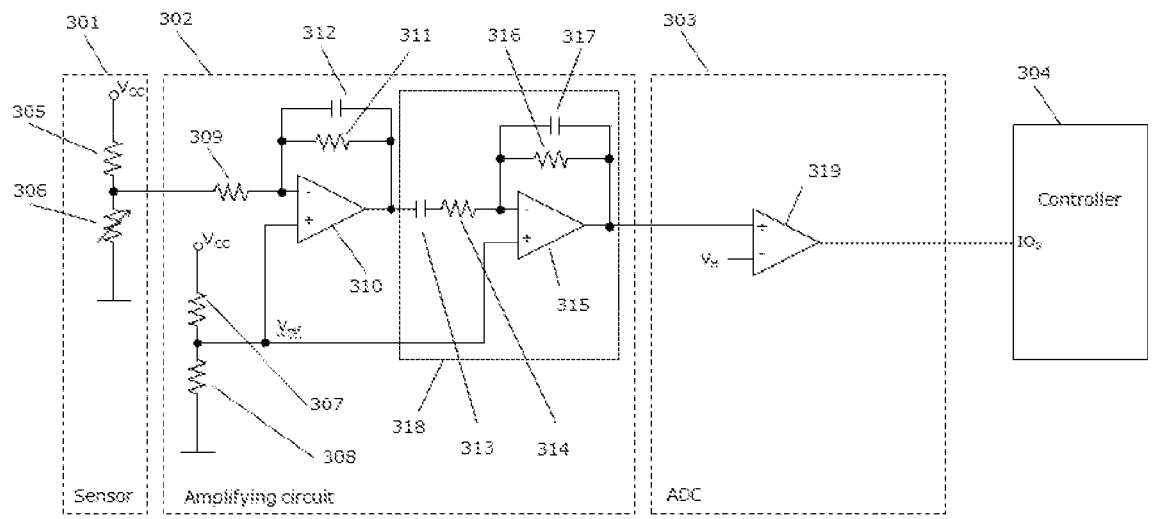
FIG. 3 is a circuit diagram of an input apparatus according to an embodiment of the present disclosure.

Shown in FIG. 3 is a circuit diagram of an input apparatus according to an embodiment of the present disclosure. In this embodiment, the input apparatus is configured to detect a change in strain introduced by deformation of the housing. It is appreciated that the change in strain may be caused by a grip operation on the housing, which leads to a part of the housing being squeezed on stretched.

The sensor 301 includes a resistor 305 and a strain gauge 306 that are connected in series between a voltage Vcc and ground. The first signal is a voltage signal outputted from a common node between the resistor 305 and the strain gauge 306. The first signal is increased in response to resistance of the strain gauge 306 increasing.

The amplifying circuit 302 includes an input resistor 309, two stages of amplifiers, a high-pass filter, and a referential circuit. A first stage includes an amplifier 310, a feedback resistor 311, and a feedback capacitor 312. The input resistor 309 is connected to an inverting input terminal of the amplifier 310. The feedback resistor 311 and the capacitor 312 are connected in parallel between the inverting input terminal and an output terminal of the amplifier 310. The second stage includes an amplifier 315, a feedback resistor 316, and a feedback capacitor 317. The high-pass filter includes a capacitor 313 and a resistor 314 that are connected in series, and the high-pass filter is connected between an inverting input terminal of the amplifier 315 and the output terminal of the amplifier 310. The feedback resistor 316 and the capacitor 317 are connected in parallel between the inverting input terminal and an output terminal of the amplifier 315. The referential circuit includes a resistor 307 and a resistor 308 that are connected in series between the voltage Vcc and the ground. The referential signal is a voltage Vref outputted from a common node between the resistor 307 and the resistor 308, and coupled to non-inverting input terminals of both the amplifiers 310 and 315. A difference between the first signal and Vref is amplified by the two stages, and the second signal is a voltage outputted from the output terminal of the amplifier 315. An offset may be set for the amplifier in the first stage, and the difference is not amplified in case of being smaller that the offset, so as to screen some noises in the first signal.

The ADC 303 includes a comparator 319. The second signal and a high-reference voltage $V_H$ are couple to two input terminals of the comparator 319. The digital signal is outputted from the comparator 319, and is active in response to the second signal being higher that the high-reference signal. The digital signal is inputted into the controller 304 via an input terminal $IO_0$ of the controller 304, for recognizing the type of the inputting operation.

It should be noted that the sensor 301 may be configured in other appropriate manners, as long as it can reflect an inputting operation in the first signal. As an example, the resistor 305 and the strain gauge 306 may be interchanged with each other in the circuit as shown in FIG. 3, and the first signal decreases in response to the resistance of the strain gauge 306 increasing.

It should be noted that although the amplifying circuit 302 in FIG. 3 includes two stages, the present disclosure is not limited thereto. In other embodiments, there may be one or more stages cascaded between the first and second stages illustrated in FIG. 3, and each of the one or more stages has a similar structure to the first stage. As an example, each of the one or more stages includes an amplifier, a feedback resistor and a feedback capacitor are connected in parallel between the inverting input terminal and an output terminal of such amplifier, and the voltage Vref is coupled to a non-inverting input terminal of such amplifier. An input resistor may be connected between an inverting input terminal of the amplifier in one stage and an output terminal of the amplifier in a previous stage. It is further noted that other circuits capable to amplify a signal may also be suitable for each stage in the amplifying circuit 302, as long as there is a high-pass filter connected between the last two stages.

With the input apparatus as described above, the inputting operation especially deformation of housing of an electronic device can be detected with a simple circuit. The electronic device with the input apparatus is capable to be controlled via additional operations, such as gripping the electronic device. The input apparatus has a low cost and a large input range, and is capable to process signals from one or more sensors. Thereby, users can give instructions through novel inputting operations, and performances of the electronic device are greatly improved.

Figure 4:
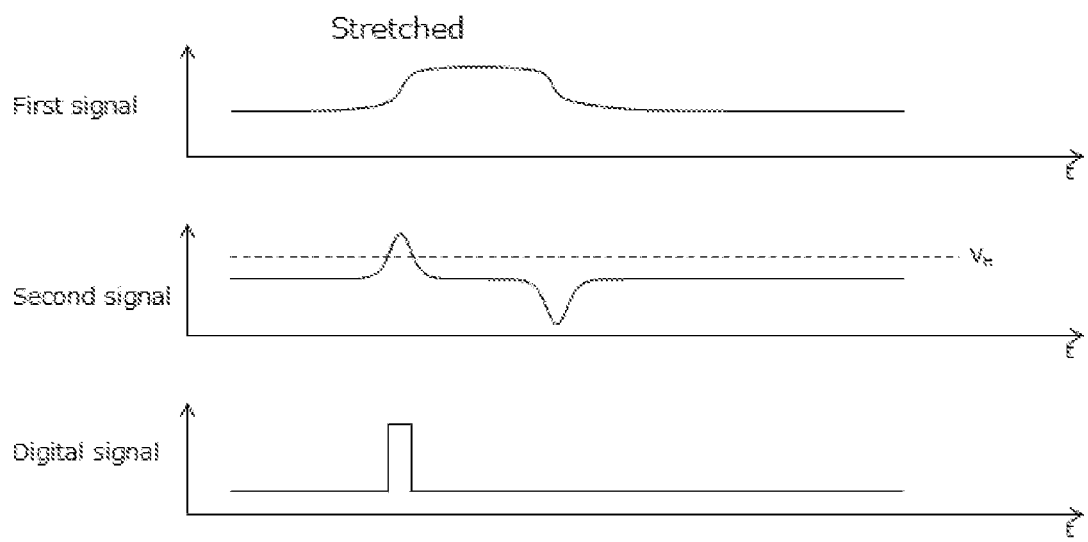
FIG. 4 is a graph of waveforms of signals in an input apparatus according to an embodiment of the present disclosure.

In one embodiment, a process of recognizing the type of the inputting operation is described as follows. The inputting operation is assumed to be a stretch on a part of housing of an electronic device, and the strain gauge 306 is arranged on the housing to detect deformation of such part. Reference is made to FIG. 4, which shows waveforms of the first signal, the second signal, and the digital signal.

In this embodiment, the sensor and the ADC may be same as those shown in FIG. 3. Resistance of the strain gauge 306 is increased when the part of housing being under a tensile strain. Hence, the first signal increases then decreases in response to one stretch. The difference between the first signal and the referential voltage Vref is amplified across each stage in the amplifying circuit 302.

In this embodiment, the amplifying circuit 302 is assumed to include N stages, each of the 1st to (N−1)th stages has a same structure with the first stage in FIG. 3, the Nth stage has a same structure with the second stage in FIG. 3, and the high-pass filter is connected between the (N−1)th and the Nth stages. Accordingly, an output of the ith stage may be calculated as:

$$Vi_{out}=Ai*(Vi_{in}-Vref)+Vref, \quad (1)$$

where $Vi_{out}$ and $Vi_{in}$ denote an output voltage and an input voltage, respectively, of the ith stage, Ai denotes a gain of the amplifier in the ith stage, and $1 \leq i \leq N$. For the Nth stage, the outputted second signal may be calculated as:

$$VN_{out}=AN*(VN_{in}-Vref)+Vref=AN*VN_{inac}+AN*(VN_{indc}-Vref)+Vref, \quad (2)$$

where $VN_{inac}$ and $VN_{indc}$ denote an alternating-current (AC) component and a direct-current (DC) component in an input voltage of the Nth stage, respectively. The second term $AN*(VN_{indc}-Vref)$ represents a DC signal, and therefore is rejected by the high-pass filter before being inputted into the Nth stage. Accordingly, the signal is:

$$VN_{out}=AN*VN_{inac}+Vref. \quad (3)$$

Hence, the second signal merely reflects a decrease or an increase in the first signal. In this embodiment as shown in FIG. 4, the increase of the first signal is reflected by a peak in the second signal, and the decrease of the first signal is reflected by a valley in the second signal.

It is noted that the DC signal is rejected for avoiding saturation of the second signal. From equation (2), it is apparent that the VNout easily saturates due to $VN_{indc}$. For example, assuming Vcc=2.8V, Vref=1.4V and AN=1000, VNout would saturate even if $VN_{indc}$ is 1.402V. In order to avoid such saturation, the referential voltage Vref may be adjusted, or a component of the circuit may be adjusted to change a gain, an offset or a resistance in each stage. Such adjustment brings difficulty for manufacture and quality control. By rejecting the DC signal, such difficulty is avoided because the second signal is insensitive to variation of the aforementioned parameters in each stage.

Reference is made back to FIG. 4. The second signal is compared with the high-reference signal by the comparator 319 in ADC 303. Since the digital signal outputted by the comparator 319 is active in response to the second signal being higher than the high-reference signal $V_H$, the peak in the second signal would be reflected by a pulse in the digital signal in a case that the peak is higher than $V_H$. Accordingly, the controller can recognize the stretch based on such pulse.

It is further noted that another advantage of rejecting the DC signal by the high-pass filter is that the second signal varies on a basis of Vref, as shown in equation (3). Therefore, the high reference signal $V_H$ can be set by adding an offset voltage on Vref. Such offset voltage may be set for recognizing an effective peak while neglecting a noise in the second signal.

It can be appreciated that although the digital signal in FIG. 4 is high-level active, it may be low-level active in other embodiments. Moreover, the comparator 319 may use a low-reference voltage $V_L$ as an alternative of the high-reference signal $V_H$. In such case, $V_L$ can be set by subtracting an offset voltage from Vref, and the valley in the second signal may be reflected by a pulse in the digital signal in a case that the valley is lower than $V_L$. Similarly, the controller can recognize the stretch based on such pulse.

Figure 5:
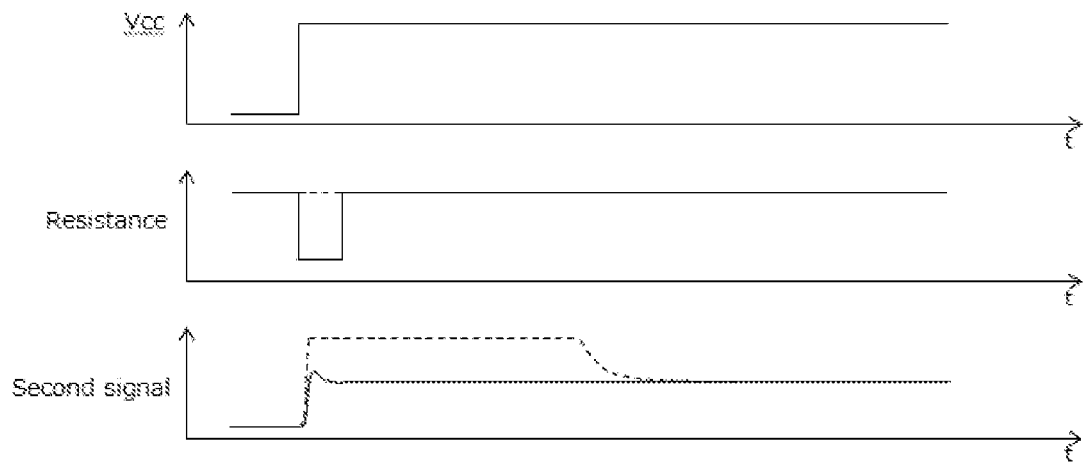
FIG. 5 is a graph of waveforms of signals and resistance in wakeup of an input apparatus according to an embodiment of the present disclosure.

For the amplifying circuit, a wakeup time of the amplifier in the last stage determines how fast the amplifying circuit can stabilize the second signal in response to the voltage Vcc being applied, and therefore determines how fast the whole input apparatus can operate normally after being powered. In one embodiment as shown in FIG. 3, the wakeup time is determined by a charging time of the capacitor 313 in the high-pass filter, and such charging time is determined by a time constant of a RC circuit formed by the capacitor 313 and the feedback resistor 316. Hence, in order to reduce the wakeup time of the amplifier 315, capacitance of the capacitor 313 and resistance of the feedback resistor 316 should be lower, which would nevertheless reduce the gain of the amplifier 315. To address such tradeoff between the wakeup time and the gain, the feedback resistor 316 may be a variable resistor. In case of waking up, resistance of the feedback resistor 316 is set low for a fast response. In a case that the waking up is over, the resistance of the feedback resistor 316 is set high to achieve a high gain of the amplifier 315. FIG. 5 shows a schematic diagram of wakeup time of an amplifying circuit under high and low resistance of a feedback resistor. Comparison between dashed lines and solid lines shows that a decrease of the resistance at waking up would greatly reduce a width of a pulse caused by applying Vcc.

Figure 6:
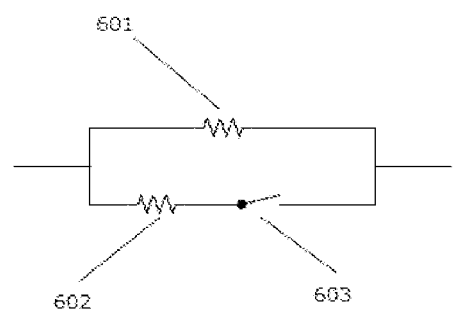
FIG. 6 is a schematic diagram of a circuit with variable resistance according to an embodiment disclosure.

In addition, the feedback resistor 316 may be a circuit with variable resistance. In one embodiment as shown in FIG. 6, the circuit may include a resistor 601, a resistor 602, and a switch 703. The resistor 602 and the switch 703 are connected in series, to form a branch that is in parallel with the resistor 601. Resistance of the circuit is reduced in a case that the switch 703 is on. As an example, the switch 703 may be a mechanical switch, a MEMS (micro-electro-mechanical system) switch, or back-to-back transistors.

As mentioned above, the comparator in the ADC may compare the second signal with a high-reference signal $V_H$ or a low-reference signal $V_L$, so as to recognize a peak or a valley, respectively, in the second signal. In some embodiments, the ADC may include multiple comparators, and each comparator receives the second signal. The multiple comparators include at least one first comparator and at least one second comparator. Each first comparator is provided with a corresponding high-reference signal. An output signal of each first comparator is active in response to the second signal being higher than the corresponding high-reference signal. Each second comparator is provided with a corresponding low-reference signal. An output signal of each second comparator is active in response to the second signal being lower than the corresponding high-reference signal. Hence, each first comparator is capable to recognize a peak in the second signal, and each second comparator is capable to recognize a valley in the second signal. The high-reference signals for each first comparator may be same or different, and the low-reference signals for each first comparator may be same or different. In case of being different, the first comparators are capable to recognize peaks with different heights, and the second comparators are capable to recognize valleys with different depths. It is appreciated that such configuration enables the digital signal to reflect different degrees of the deformation, for example, different strengths in squeezing or stretching the housing of the electronic device.

Figure 7:
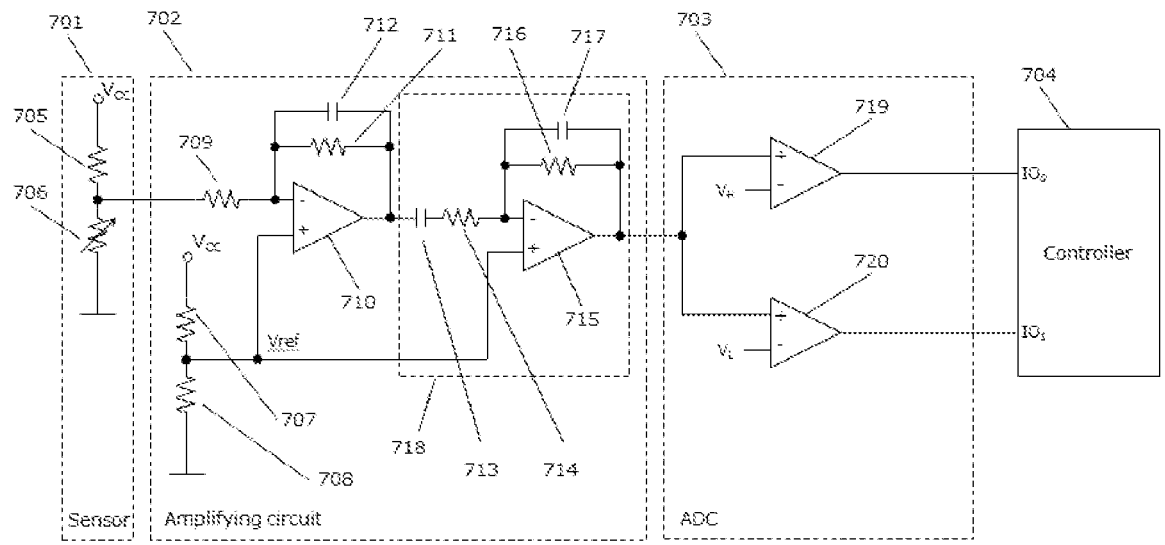
FIG. 7 is a circuit diagram of an input apparatus according to another embodiment of the present disclosure.

Reference is made to FIG. 7, which is based on FIG. 3 and differs from FIG. 2 in a structure of the ADC. In one embodiment, the ADC 703 includes one first comparator 719 and one second comparator 720. The digital signal includes two channels. One of the two channels is an output signal from the first comparator, and coupled into an input terminal $IO_0$ of the controller. The other of the two channels is an output signal from the second comparator, and coupled into an input terminal $IO_1$ of the controller. Waveforms of the first signal, the second signal, and the digital signal are shown in FIG. 8.

In response to a part of housing of an electronic being stretched, the first signal increases and then decreases, and a peak then a valley occur in the second signal accordingly. Details may refer to description concerning FIG. 4, and is not repeated herein. In a case that the peak is higher than a high-reference signal $V_H$ for the first comparator and the valley is lower that a low-reference signal $V_L$ of the second comparator, the digital signal comprises a pulse sent into $IO_0$ and a subsequent pulse sent into $IO_1$. In a similar manner, in response to the part of the housing being squeezed, the digital signal comprises a pulse sent into $IO_1$ and a subsequent pulse sent into $IO_0$. Therefore, the controller can recognize whether the part of the housing is squeezed or stretched via a sequence of pulses sent into terminals $IO_0$ and $IO_1$.

Figure 8:
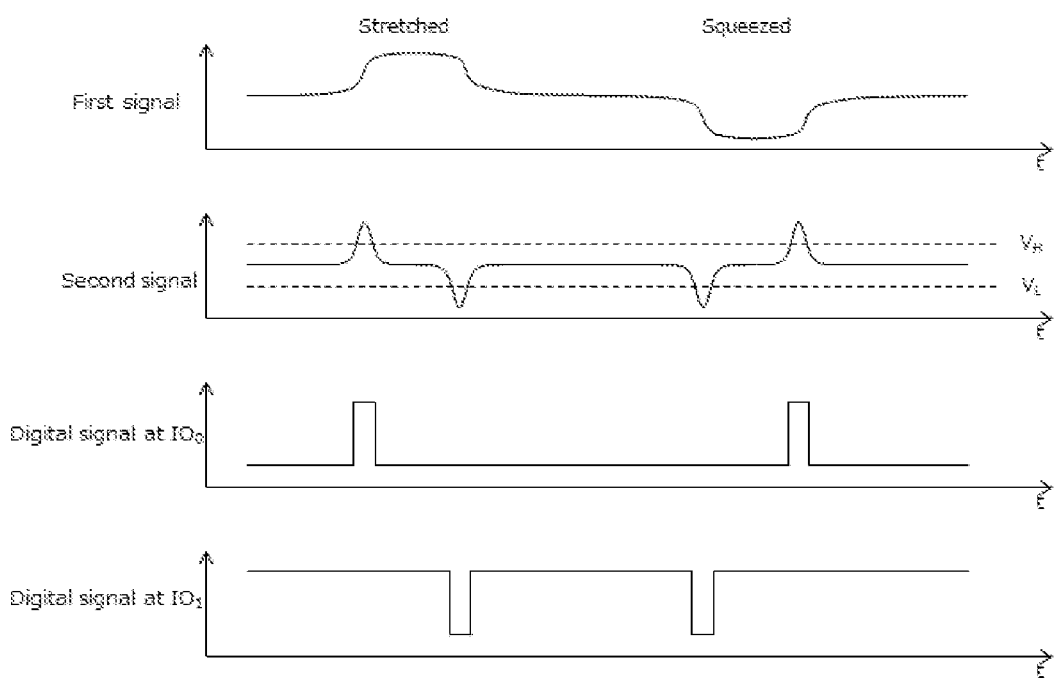
FIG. 8 is a graph of waveforms of signals in an input apparatus according to another embodiment of the present disclosure.

It could be appreciated that although the output signal of first comparator is high-level active and the output signal of the second comparator is low-level active in FIG. 8, the present disclosure is not limited thereto. The output signal of each comparator may be either high-level active or low-level active, as long as it fits a requirement of a corresponding input terminal of the controller.

Figure 9:
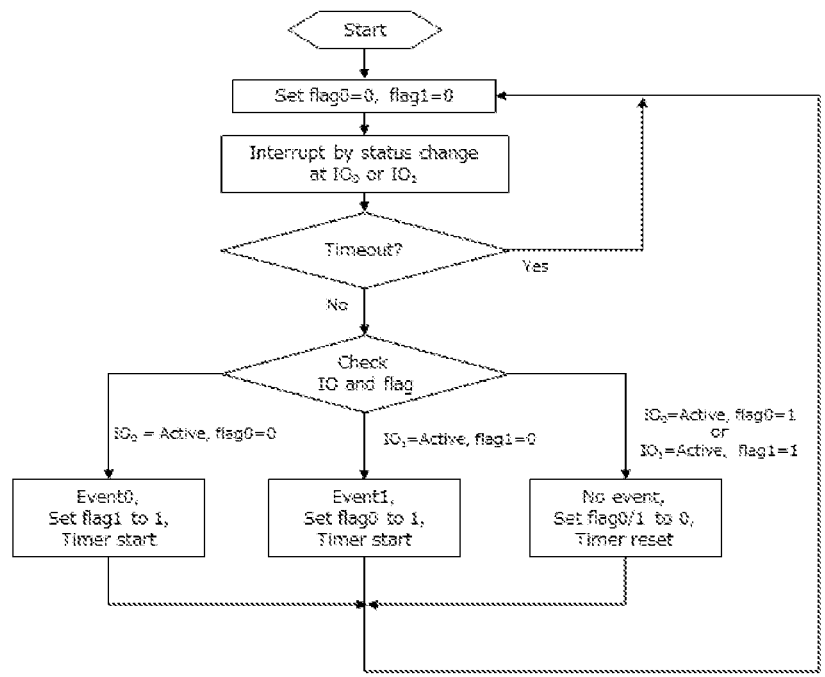
FIG. 9 is a flowchart for recognizing a sequence of pulses in a digital signal according to an embodiment of the present disclosure.
Figure 10:
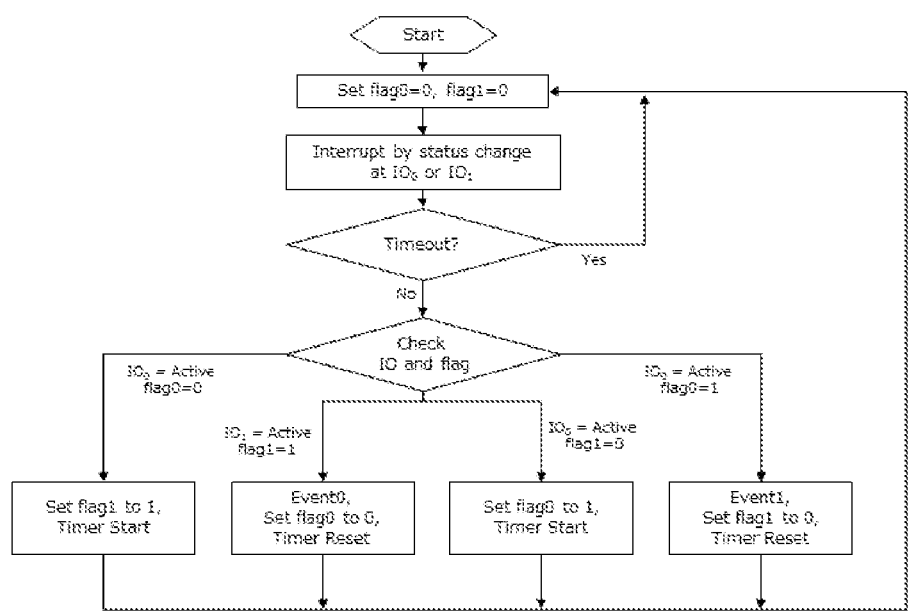
FIG. 10 is another flowchart for recognizing a sequence of pulses in a digital signal according to an embodiment of the present disclosure.

There are various methods for recognizing a sequence of the pulses in a digital signal sent into the input terminals of the controller. In one embodiment, such method may be mainly based on a controlling logic programmed in the controller. Hence, the input apparatus especially the ADC may have a simple structure, facilitating downsize of the input apparatus. The controller may be an integrated circuit such as a field-programmable gate array (FPGA). FIGS. 9 and 10 shows two exemplary controlling flowchart for the controller, where the controller utilizes two flags and timer to recognize two different events. To facilitate description, hereinafter a controlling process is illustrated on a basis of the two sequences shown in FIG. 8, where event0 represents the stretch and event1 represents the squeeze. It can be appreciated that the two events may represent other inputting operations in other embodiments, as long as these inputting operations can be reflected by different sequences of pulses in the digital signal.

In FIG. 9, flag0 and flag1 are initially set to be 0. The controller keeps monitoring status changes in $IO_0$ and $IO_1$. The status change refers that the digital signal sent into $IO_0$ or $IO_1$ changes between being active and being inactive. In response to the status change in either $IO_0$ or $IO_1$, the controller determines whether the timer times out. In case of a positive determination, such status change is deemed to be irrelevant to a previous pulse and start no new sequence, and thereby the controller sets both the flag0 and flag1 to be 0 and then returns to monitor the status change. In case of a negative determination, such status change is either relevant to a previous pulse (when the timer times but does not time out) or starts a new sequence (when the timer does not time), the controller checks the status of $IO_0$, $IO_1$, flag0 and flag1.

In a case that $IO_0$ is active and flag0 is 0, it is determined that event0 starts, and the timer starts timing. In a case that $IO_1$ is active and flag1 is 0, it is determined that event1 starts, and the timer starts timing. In a case that $IO_0$ is active and the flag0 is 1, or $IO_1$ is active and the flag1 is 1, it is determined that there is a present event that just occurs, the timer is reset to prepare for a next event, and both flag0 and flag 1 is set to be 0. Otherwise, it may be determined that no new event starts, and the timer and the flags are kept unchanged. Then, the controller returns to monitor the status changes in $IO_0$ and $IO_1$.

The flowchart in FIG. 10 is similar to that in FIG. 9, except that the logic after checking the status of $IO_0$, $IO_1$, flag 0 and flag 1 is different. In a case that $IO_0$ is active and flag0 is 0, the flag 1 is set to be 1 and the timer starts timing. In a case that $IO_1$ is active and flag 1 is 1, it is determined that event0 has just occurred, the timer is reset, and flag 1 is set to be 0. In a case that $IO_1$ is active and flag 1 is 0, the flag 0 is set to be 1 and the timer starts timing. In a case that $IO_0$ is active and flag 0 is 1, it is determined that event1 has just occurred, the timer is reset, and flag 0 is set to be 0. Otherwise, it may be determined that no new event starts, and the timer and the flags are kept unchanged. Then, the controller returns to monitor the status changes in $IO_0$ and $IO_1$.

It is appreciated "0" and "1" in FIGS. 9 and 10 represent two status for each flag, and do not limit a specific value of each flag.

Another method for recognizing a sequence of the pulses sent into the input terminals of the controller may utilize a logic circuit and delays. The delays and the logic circuit may serve as a part of the ADC. Namely, output signals from the comparators may be first converted into the digital signal via the delays and the logic circuit, and then sent into the controller. Thereby, the ADC is capable to generate a simpler digital signal for the controller to recognize the inputting operations. Relevant processing bore by the controller is alleviated, facilitating a better performance for the electronic device.

Figure 11:
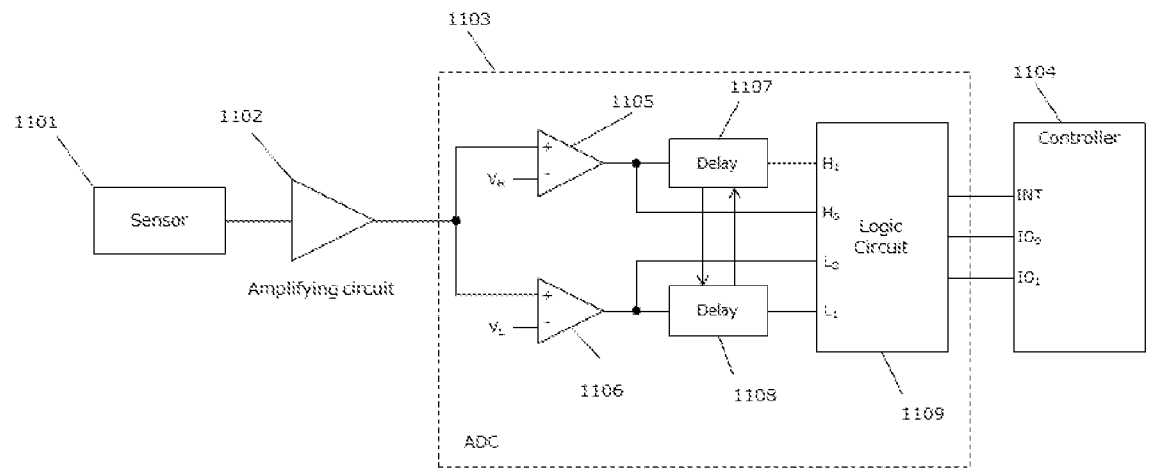
FIG. 11 is a schematic circuit diagram of an input apparatus according to another embodiment of the present disclosure.

In one embodiment, a schematic structural diagram of the input apparatus may be as shown in FIG. 11. The ADC 1203 differs from the ADC 703 in that two delays 1107 and 1108 and a logic circuit 1109 are connected between the controller 1104 and the two comparators, namely, the first comparator 1105 and the second comparator 1106. The logic circuit 1109 has four input terminals $H_0$, $H_1$, $L_0$ and $L_1$, and three output terminals that are coupled to input terminals INT, $IO_0$ and $IO_1$, respectively, of the controller 1104. An output signal from the first comparator 1105 is coupled to $H_0$, and coupled to $H_1$ via the delay 1107. An output signal from the second comparator 1106 is coupled to $L_0$, and coupled to $L_1$ via the delay 1108.

An output signal of the delays 1107 and 1108 is kept active for a delay period in response to an input signal thereof being active. It is appreciated that such delay period for the delays 1107 and 1108 may be same or different. The delays 1107 and 1108 operate in a mutual-latching mode, namely, the output signal of one delay is forced inactive in response to the output signal of the other delay being active. In the drawings, such mutual latching mode is indicated by two arrows with opposite directions between the two delays, if not defined otherwise.

The logic circuit 1109 is capable to output different patterns of the digital signal to the controller 1104. Herein the pattern refers to a channel or a combination of channels at which a signal is active in the digital signal. There are various methods to program the logic circuit 1109 to achieve such function. Three embodiments are illustrated as follows, where a stretch and a squeeze are reflected as a pulse inputted into $IO_0$ and $IO_1$, respectively. It is noted that the present disclosure is not limited thereto. Other inputting operations can be recognized in a similar manner as long as they are reflected by a peak, a valley or a sequence of peaks or valleys in the second signal. Further, the logic circuit may be programed in other manners similar to the following embodiments, as long as different patterns of the digital signal are outputted based on different inputting operations.

Figure 12:
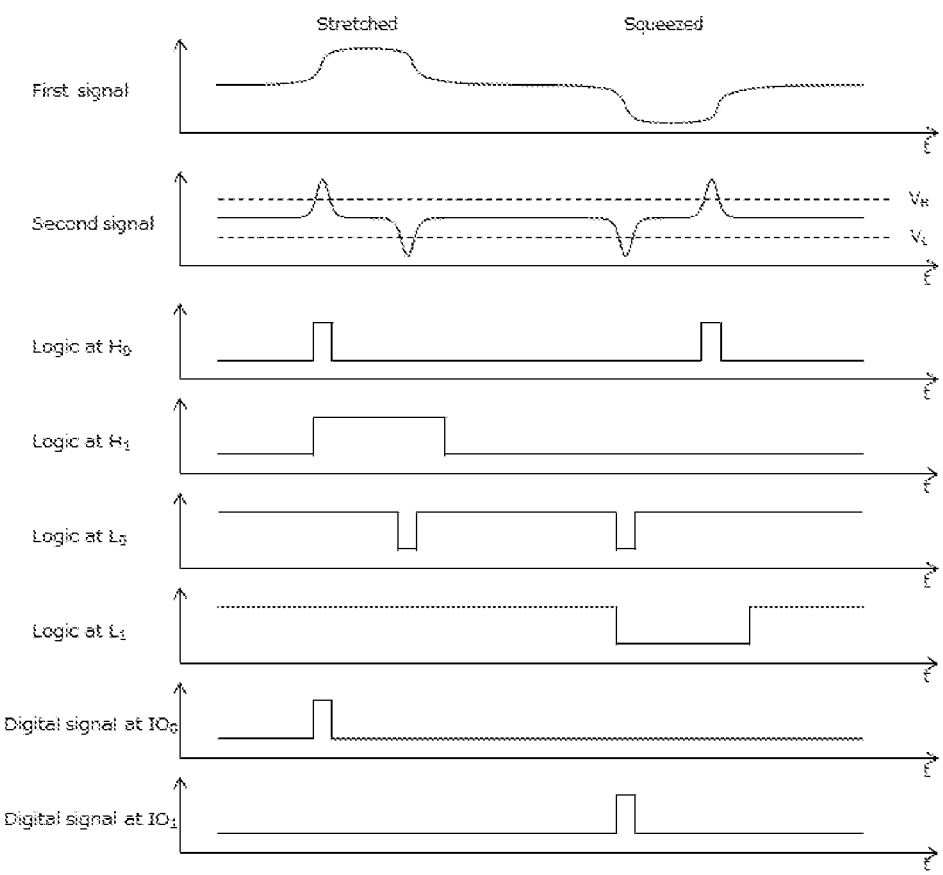
FIG. 12 is a graph of waveforms of signals in an input apparatus according to another embodiment of the present disclosure.
Figure 13:
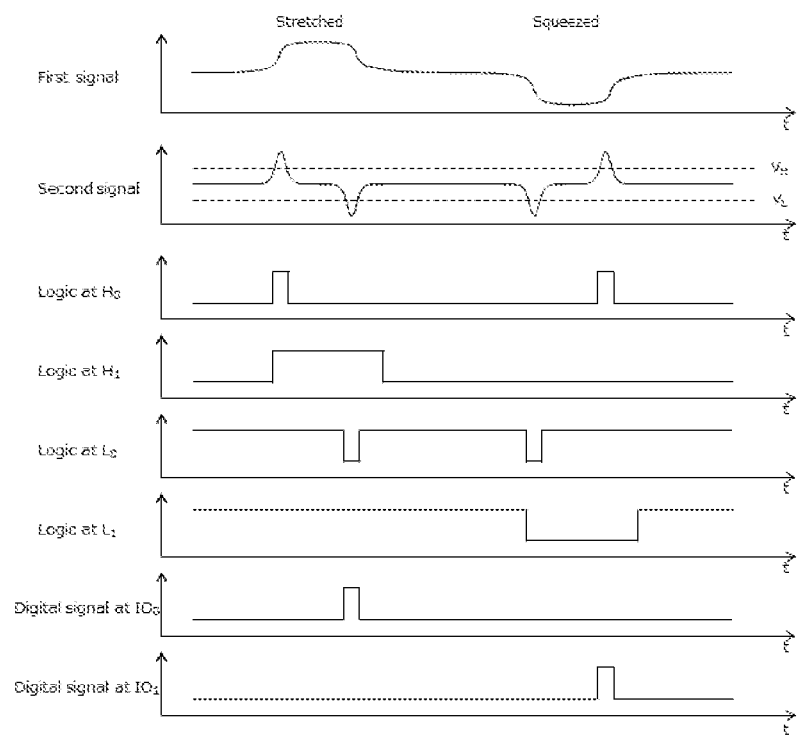
FIG. 13 is a graph of waveforms of signals in an input apparatus according to another embodiment of the present disclosure.
Figure 14:
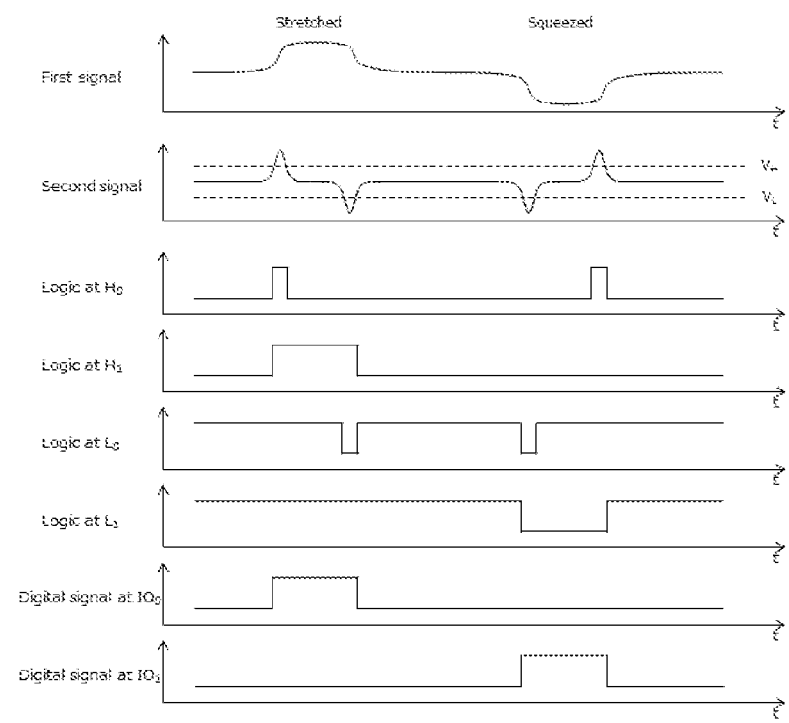
FIG. 14 is a graph of waveforms of signals in an input apparatus according to another embodiment of the present disclosure.

FIGS. 12 to 14 show schematic waveforms of the first signal, the second signal, and signals at input terminals and output terminals of the logic circuit according to embodiments of the present disclosure. FIGS. 12 to 14 are similar to each other in the first signal, the second signal, and the signals at $H_1$ to $L_1$, to facilitate illustration. In case of a stretch, the sequence of pulses is a peak then a valley, and the signal at $H_1$ turns active first, which forces the signal at $L_1$ to be inactive. In case of a squeeze, the sequence of pulses is a valley then a peak, and the signal at $L_1$ turns active first, which forces the signal at $H_1$ to be inactive. Hence, the signals at $H_1$ and $L_1$ are exclusively active, and may be used to trigger different patterns in the digital signal at $IO_1$ and $IO_0$, so that the controller is capable to distinguish the squeeze and the stretch accordingly.

For each of FIGS. 12 to 14, the signal at $IO_0$ is triggered to be active within the delay period of the delay 1107 after the signal at $H_1$ (or $H_0$) turns active, and the signal at $IO_1$ is triggered to be active with the delay period of the delay 1108 after the signal at $L_1$ (or $L_0$) turns active. It should be noted that the logic circuit may configure the signal at the output terminal thereof in other manners. As long as each output terminal of the logic circuit is triggered to be active within the delay period of any delay in response to an output signal from a comparator corresponding to such delay being active, a pulse in the digital signal can reflect the inputting operation, and the controller is capable to recognize the inputting operation via the pulse. For example, a signal at a terminal INT of the controller 1104 may be triggered to be active within the delay period after the signal at either $H_0$ or $L_0$ turns active, and in such case the controller can recognize there is a squeeze or a stretch via the terminal INT.

FIGS. 12 to 14 differ in a manner of how to trigger the pulse at $IO_0$ and $IO_1$ within the delay period of the delays 1107 and 1108, respectively. In FIG. 12, the signal at $IO_0$ is active in response to the output signal of the first comparator 1105 being active, and the signal at $IO_1$ is active in response to the output signal of the second comparator 1106 being active. In FIG. 13, the signal at $IO_0$ is active in response to the output signal of the second comparator 1106 being active within the delay period of delay 1107 after the output signal of the first comparator 1105 being active, and the signal at $IO_1$ is active in response to the output signal of the first comparator 1105 being active within the delay period of delay 1108 after the output signal of the second comparator 1106 being active. In FIG. 14, the signal $IO_0$ is active in response to the signal at $H_0$ being active, and is inactive in response to the signal at $H_1$ being inactive or the signal at $L_0$ being active; and the signal $IO_1$ is active in response to the signal at $L_0$ being active, and is inactive in response to the signal at $L_1$ being inactive or the signal at $H_0$ being active. Table I, Table II and Table III are truth tables for the logic circuit corresponding to FIGS. 12 to 14, respectively. In the Tables I to III, the symbols "0" and "1" represents a low level and a high level, respectively. Further, the symbol "-" represents that a corresponding combination of $H_0$, $H_1$, $L_0$ and $L_1$ is "pseudo" and may not occur in practice, and the symbol "X" represents either "0" or "1". It is appreciated that those skilled in the art can program the logic circuit appropriately to implement the function as described in FIGS. 12 to 14 on the basis of Table I to III.

TABLE I

| $H_0$ | $H_1$ | $L_0$ | $L_1$ | $IO_0$ | $IO_1$ |
|---|---|---|---|---|---|
| 0 | 0 | 0 | 0 | 0 | 1 |
| 0 | 0 | 0 | 1 | 0 | 1 |
| 0 | 0 | 1 | 0 | 0 | 0 |
| 0 | 0 | 1 | 1 | 0 | 0 |
| 0 | 1 | 0 | 0 | — | — |
| 0 | 1 | 0 | 1 | 0 | 0 |
| 0 | 1 | 1 | 0 | — | — |
| 0 | 1 | 1 | 1 | 0 | 0 |
| 1 | 0 | 0 | 0 | — | — |
| 1 | 0 | 0 | 1 | — | — |
| 1 | 0 | 1 | 0 | 0 | 0 |
| 1 | 0 | 1 | 1 | 1 | 0 |
| 1 | 1 | 0 | 0 | — | — |
| 1 | 1 | 0 | 1 | — | — |
| 1 | 1 | 1 | 0 | — | — |
| 1 | 1 | 1 | 1 | 1 | 0 |

TABLE II

| H$_0$ | H$_1$ | L$_0$ | L$_1$ | IO$_0$ | IO$_1$ |
|---|---|---|---|---|---|
| 0 | 0 | 0 | 0 | 0 | 0 |
| 0 | 0 | 0 | 1 | 0 | 0 |
| 0 | 0 | 1 | 0 | 0 | 0 |
| 0 | 0 | 1 | 1 | 0 | 0 |
| 0 | 1 | 0 | 0 | — | — |
| 0 | 1 | 0 | 1 | 1 | 0 |
| 0 | 1 | 1 | 0 | — | — |
| 0 | 1 | 1 | 1 | 0 | 0 |
| 1 | 0 | 0 | 0 | — | — |
| 1 | 0 | 0 | 1 | — | — |
| 1 | 0 | 1 | 0 | 0 | 1 |
| 1 | 0 | 1 | 1 | 0 | 0 |
| 1 | 1 | 0 | 0 | — | — |
| 1 | 1 | 0 | 1 | — | — |
| 1 | 1 | 1 | 0 | — | — |
| 1 | 1 | 1 | 1 | 0 | 0 |

TABLE III

| H$_0$ | H$_1$ | L$_0$ | L$_1$ | IO$_0$(n − 1) | ID1(n − 1) | IO$_0$ | IO$_1$ |
|---|---|---|---|---|---|---|---|
| 1 | X | 1 | 1 | 0 | 0 | 1 | 0 |
| X | 1 | 0 | 1 | 1 | 0 | 0 | 0 |
| X | 0 | 1 | 1 | 1 | 0 | 0 | 0 |
| 0 | 0 | 0 | X | 0 | 0 | 0 | 1 |
| 1 | 0 | X | 0 | 0 | 1 | 0 | 0 |
| 0 | 0 | X | 1 | 0 | 1 | 0 | 0 |

Moreover, it is appreciated that although the signals at L$_1$ and L$_2$ are low-level active while other signals are high-level active in FIGS. 12 to 14 and Tables I to III, the present disclosure is not limited thereto. Any signal may be low-level active or high-level active based on a requirement of circuits.

Figure 15:
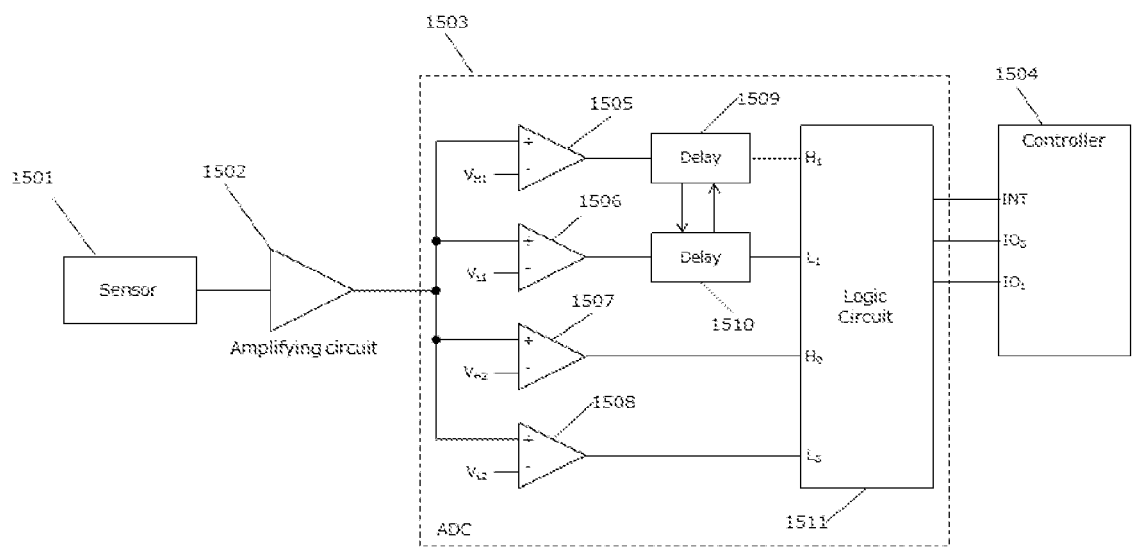
FIG. 15 is a schematic circuit diagram of an input apparatus according to another embodiment of the present disclosure.

In FIG. 11, the signals at H$_0$ and H$_1$ origin from a same first comparator 1105, and the signals at L$_0$ and L$_1$ origin from a same second comparator 1106. In another embodiment, the ADC may further include an additional first comparator 1507 and an additional second comparator 1508, as shown in FIG. 15. Other components shown in FIG. 15 correspond to those in FIG. 11. The high-reference signal for the comparator 1507 is denoted as V$_{H2}$, and the low-reference voltage signal for the comparator 1507 is denoted as V$_{L2}$. Output signals of the comparators 1507 and 1508 are coupled to terminals H$_0$ and L$_0$, respectively. The output signals of comparators 1505 and 1506 are not coupled to the terminals H$_0$ and L$_0$.

It is appreciated that the ADC 1503 in FIG. 15 has identical functions to the ADC 1103 in FIG. 11, in a case that V$_{H1}$=V$_{H2}$ and V$_{L1}$=V$_{L2}$. In such case, the waveforms in FIGS. 12 to 14 and the truth tables in Tables I to III also apply to the structure in FIG. 15.

In a case that V$_{H1}$≠V$_{H2}$ or V$_{L1}$≠V$_{L3}$, the ADC 1503 is capable to output a digital signal for recognizing a special inputting operation. Hence, functions of the input apparatus are expanded. In one embodiment, the special inputting operation is a stretch under a specific strength, and thereby the stretch generates a deeper valley in the second signal than a normal squeeze does, as shown by waveforms in FIG. 16. Hence, V$_{H2}$ may be set to be equal to V$_{H1}$, and V$_{L2}$ may be set lower than V$_{L1}$, such that merely the deeper valley can trigger the output signal from the comparator 1508 to be active, while a normal valley generated by the normal squeeze cannot. Accordingly, in a case that signals at IO$_0$ and IO$_1$ are triggered in a same manner as shown in FIG. 12, such stretch is reflected as a pulse in the signal at IO$_0$, and the normal squeeze is not reflected in the signal at IO$_1$. It is appreciated that similar concept could be applied to a case in which V$_{H1}$<V$_{H2}$ and V$_{L1}$=V$_{L2}$, so as to recognize a higher peak in a squeeze under a specific strength. It is further appreciated there may be more first comparators or more second comparators. In such case, the comparator coupled to the logic circuit via the delay may be referred to as a primary comparator, and the comparator coupled to the logic circuit without the delay may be referred to as an auxiliary comparator.

As described above, the ADC of the input apparatus may include multiple first comparators or multiple second comparators, so as to recognize stretches or squeezes under different strengths. In the method for recognizing the sequence of the pulses based on the logic circuit and the delays, an output signal of one of the multiple first comparators may connect to the delay, while output signals of the other first comparators are directly coupled to some additional input terminals of the logic circuit in a one-to-one correspondence. Similarly, an output signal of one of the multiple second comparators may connect to the delay, while output signals of the other second comparators are directly coupled to other additional input terminals of the logic circuit in a one-to-one correspondence.

Figure 17:
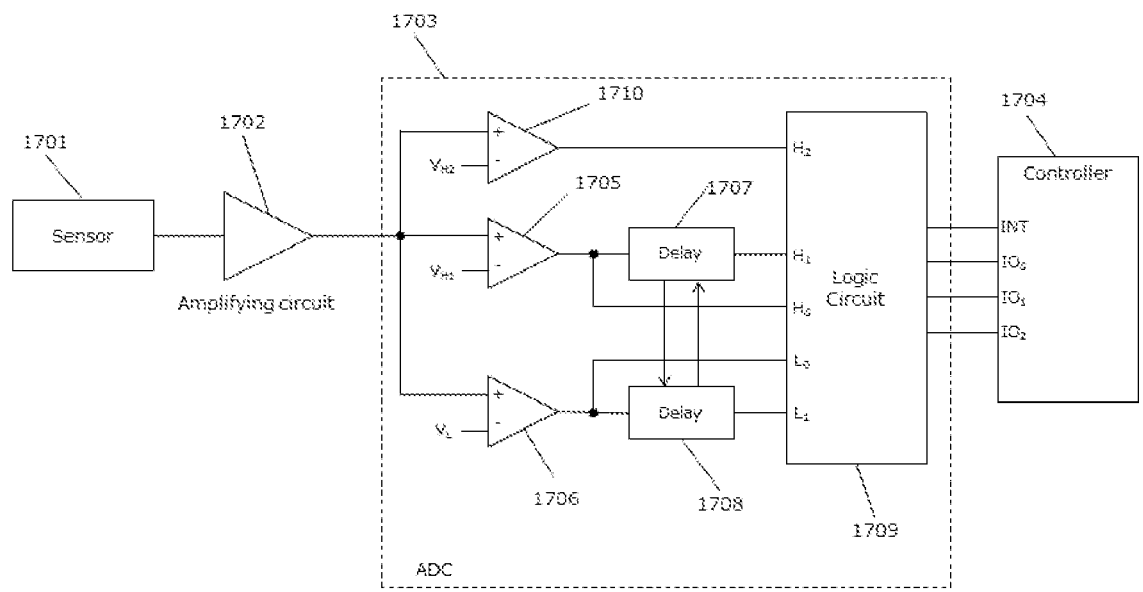
FIG. 17 is a schematic circuit diagram of an input apparatus according to another embodiment of the present disclosure.
Figure 18:
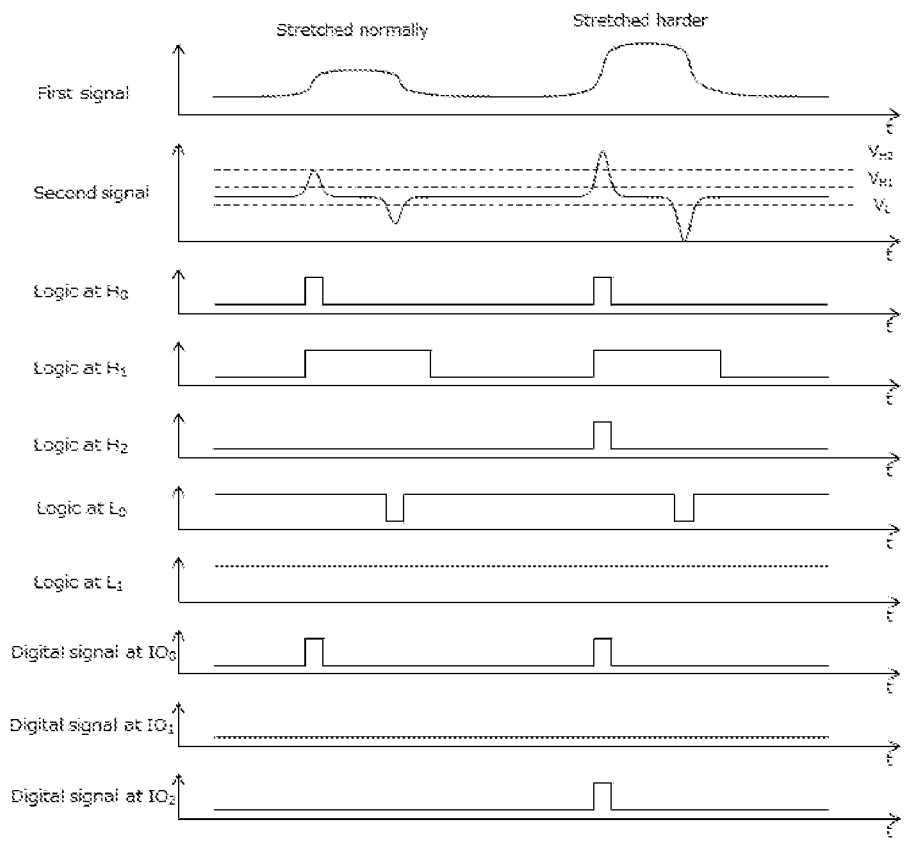
FIG. 18 is a graph of waveforms of signals in an input apparatus according to another embodiment of the present disclosure.

In one embodiment as shown in FIG. 17, the ADC 1703 further includes an additional first comparator 1710 on a basis of FIG. 11. A high-reference signal of the first comparator 1710 is denoted as V$_{H2}$. The logic circuit 1709 includes an additional input terminal H$_2$, and an output signal form the first comparator 1710 is coupled to H$_2$. The digital signal includes an additional channel coupled into terminal IO$_2$ of the controller. Waveforms corresponding to FIG. 17 are as shown in FIG. 18. The signal at IO$_2$ is active in response to the signal at H$_2$ being active. Since V$_{H2}$ is higher than V$_{H1}$, a peak in the second signal due to a gentle stretch merely generates a pulse in H$_0$, and a peak due to a strong stretch generates pulses both in H$_0$ and H$_2$. Accordingly, the controller is capable to recognize stretches base on pulses in the signal at IO$_0$, and further distinguish a strong stretch from a gentle stretch based on pulses in the signal at 102.

Figure 19:
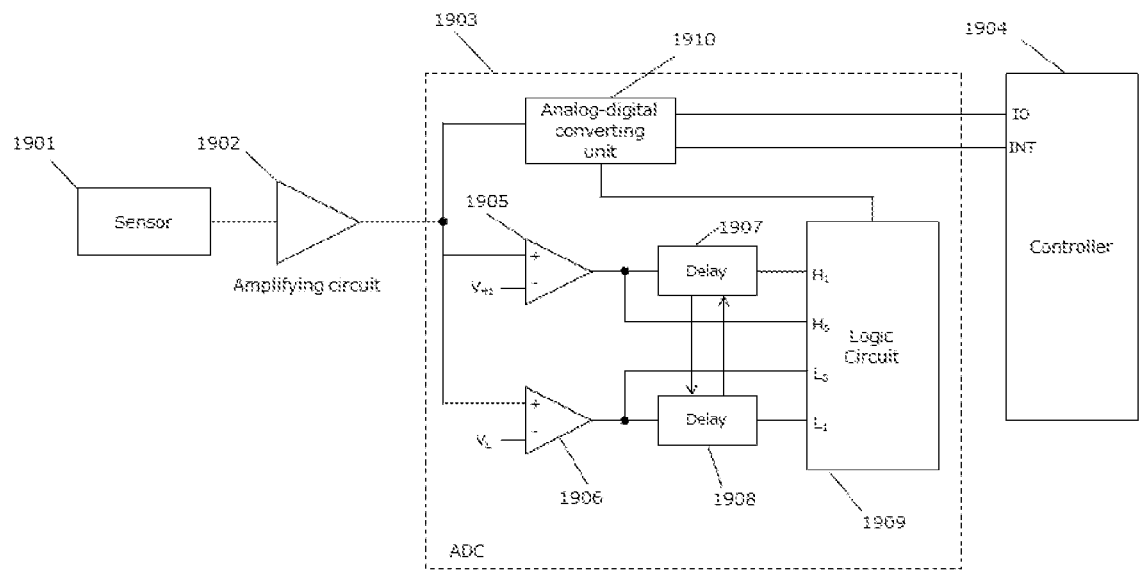
FIG. 19 is a schematic circuit diagram of an input apparatus according to another embodiment of the present disclosure.
Figure 20:
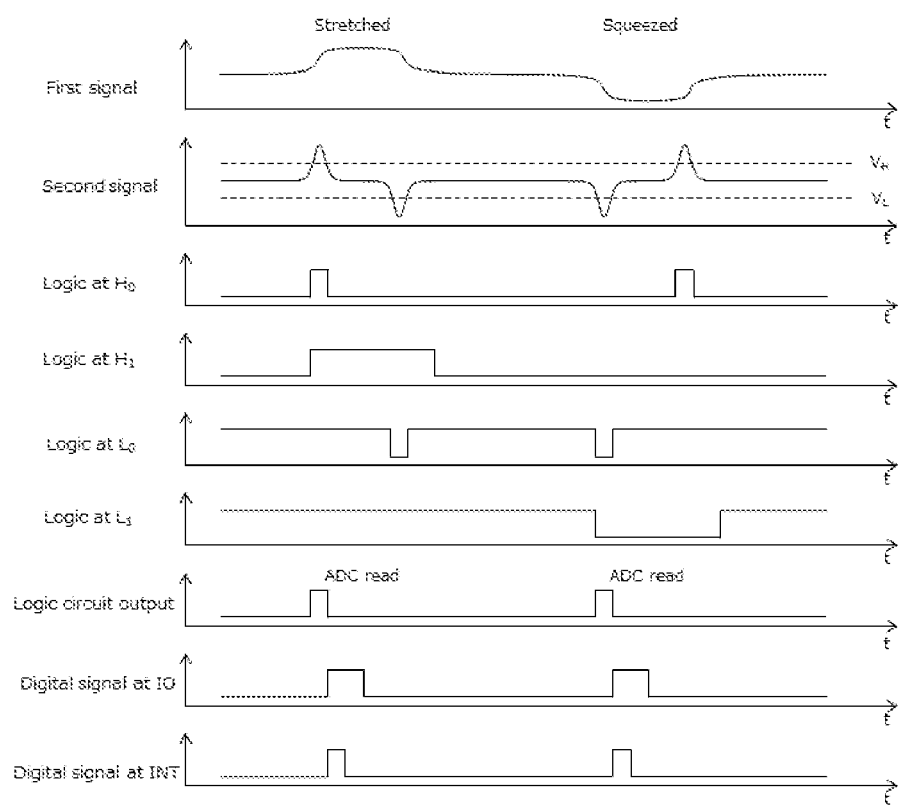
FIG. 20 is a graph of waveforms of signals in an input apparatus according to another embodiment of the present disclosure.

In some embodiments, the ADC may further include an analog-digital converting unit. The analog-digital converting unit receives both the second signal and a trigger signal sent from the logic unit. In such case, the comparators are configured to trigger the analog-digital converting unit, via the delays and the logic circuit, to read the second signal. The analog-digital converting unit generates output signals based on the second signal, and send the output signals to the controller for recognizing the inputting operations. Such outputs signals serve as the digital signal. In one embodiment, the ADC is configured as shown in FIG. 19, and corresponding waveforms are as shown in FIG. 20. It is appreciated that the analog-digital converting unit may be achieved in hardware, or a combination of hardware and software.

Figure 16:
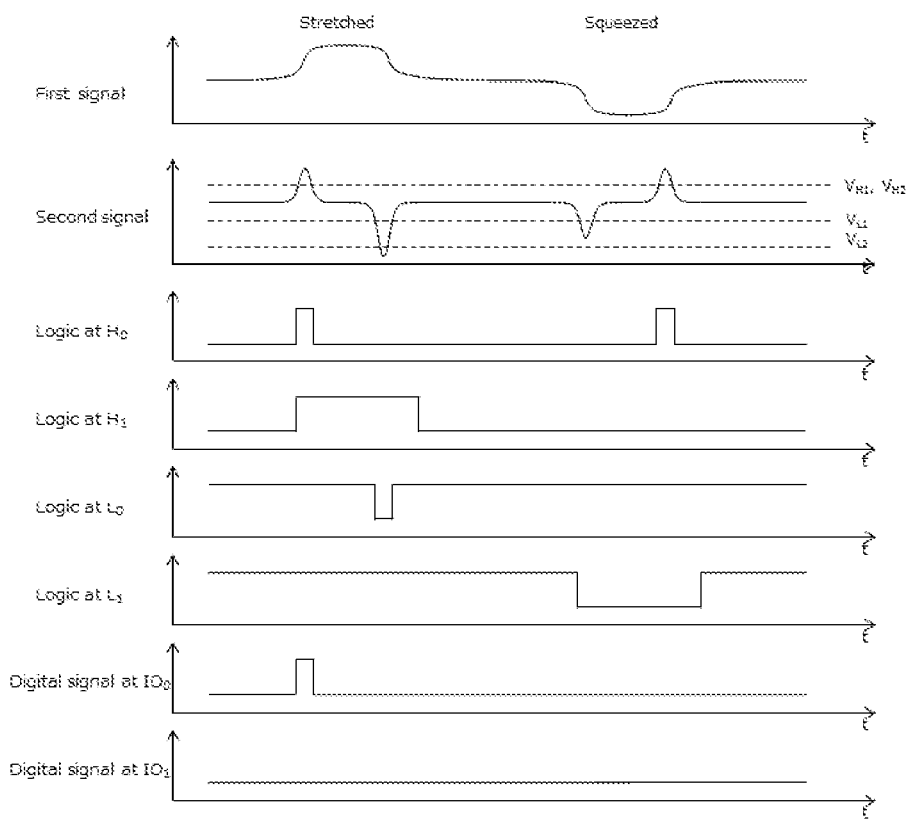
FIG. 16 is a graph of waveforms of signals in an input apparatus according to another embodiment of the present disclosure.

It is appreciated that although the signals at L$_1$ and L$_2$ are low-level active while other signals are high-level active in FIGS. 16, 18 and 20, the present disclosure is not limited thereto. Any signal may be low-level active or high-level active based on a requirement of circuits.

In the method for recognizing the sequence of the pulses based on the logic circuit and the delays, multiple amplifying circuits may share a same logic circuit according to embodiments of the present disclosure. Hence, the ADC of the input apparatus can be more integrated, and can process different combinations of status in first signals from multiple sensors. Moreover, a size of the input apparatus can be reduced without a loss in functions.

Figure 21:
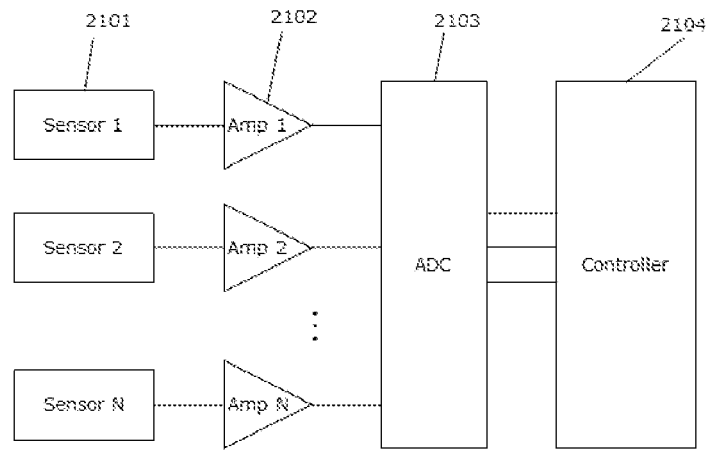
FIG. 21 is a schematic structural diagram of an input apparatus according to another embodiment of the present disclosure.

A schematic structural diagram of an input apparatus may be as shown in FIG. 21. The input apparatus may include N sensors, N amplifying circuits and an ADC. The N sensors are connected to the N amplifying circuits in a one-to-one correspondence, and the second signal outputted by the N amplifying circuits is coupled to the ADC. In one embodiment, the ADC may include a first logic circuit and a second logic circuit. The ADC may further include N first comparators, N second comparators and $2^{N-1}$ delays. The N amplifying circuits and the N first comparators are in a one-to-one correspondence, and the N amplifying circuits and the N second comparators are in a one-to-one correspondence. Namely, an output signal from each amplifying circuit is coupled to a corresponding first comparator and a corresponding second comparator.

The first logic circuit includes N pairs of first input terminals and $2^N$ first output terminals. Each pair of first input terminals receives output signals of one first comparator and one second comparator that correspond to a same amplifying circuit. Each first output terminal corresponds to a combination of N first input terminals, where each of such N first input terminals is from a different pair of first input terminals. Different first output terminals correspond to different combinations. An output signal from the first output terminal is active in response to all first input terminals in the corresponding combination being active. It is noted that the $2^N$ first output terminals can be divided into $2^{N-1}$ pairs, and each pair comprises two complementary first output terminals. Herein the "complementary" refers to that the two combinations of first input terminals corresponding to such two first output terminals include every first input terminal of the N pairs of first input terminals. Namely, none of signals at the first input terminals corresponding to one first output terminal is active, in a case that an output signal from the complementary first output terminal is active.

The $2^{N-1}$ pairs of first output terminals and the $2^{N-1}$ delays are in a one-to-one correspondence.

The second logic circuit includes $2^{N-1}$ triples of second input terminals and multiple second output terminals. The $2^{N-1}$ pairs of first output terminal and the $2^{N-1}$ triples of second input terminals are in a one-to-one correspondence. Each pair of first output terminals corresponds to a triple of second input terminals. In each pair of first output terminals, one first output terminal is coupled to one second input terminal in the corresponding triple of second input terminals, the one first output terminal is further coupled via the corresponding delay to another second terminal in the corresponding triple of second input terminals, another first output terminals is coupled to yet another second terminal in the corresponding triple of second input terminals. Similar to the delays in FIG. 11, an output signal from each of the $2^{N-1}$ delays is active for a delay period in response to an input signal of such delay being active. Further, the other delays are forced inactive in response to any delay being active. It is appreciated that the delay periods for different delays may be same or different.

It can be appreciated that the signals at each first output terminal is active in response to a specific combination of first input terminals being active, and signals at such combination of first input terminals reflects specific status of output signals from the N amplifying circuits. Therefore, the signal at each first output terminal reflects a combination of status of the N sensors. Since the first output terminal is coupled to the second logic circuit in a similar manner as shown in FIG. 11, it can be appreciated that the second logic circuit can be programed to ensure that different combinations of status of the N sensors are reflected by different patterns in the digital signal outputted from the multiple second output terminals. The second output terminals are coupled to the controller, so that the controller is capable to recognize different combination of status of the N sensors. Accordingly, different inputting operations collected by the sensors can be recognized.

In some embodiments, $2^N$ delays instead of $2^{N-1}$ delays may be included in the ADC, and accordingly the second logic circuit includes $2^N$ pairs of second input terminals. In such case, the $2^N$ first output terminal and the $2^N$ pairs of second input terminals are in a one-to-one correspondence. Each first output terminal is coupled to one second input terminal in the corresponding pair of second input terminals, and is coupled via the corresponding delay to another second terminal in the corresponding pair of second input terminals. Similarly, an output signal from each of the $2^N$ delays is active for a delay period in response to an input signal of such delay being active, and the other delays are forced inactive in response to any delay being active. It is appreciated that $2^N$ delays and $2^N$ pairs of second input terminals provide more possible logic configurations in the second logic circuit.

Figure 22:
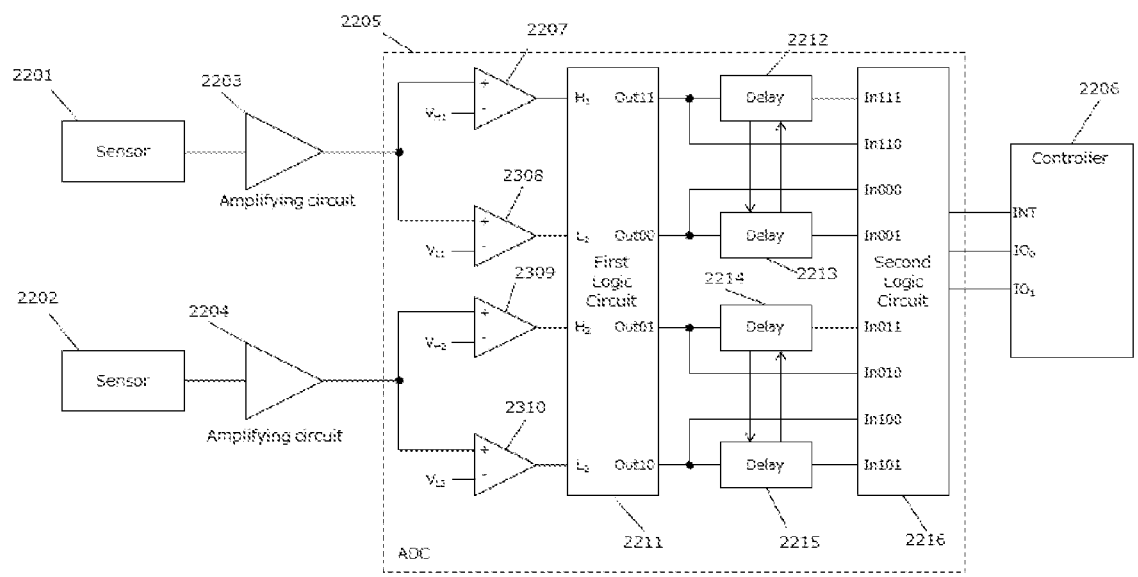
FIG. 22 is a schematic circuit diagram of an input apparatus according to another embodiment of the present disclosure.

The different inputting operations may be a combination of squeezes or stretches on different parts of housing, and each part is detected through one sensor. In one embodiment, N is equal to 2, and a structural diagram of the input apparatus may be as shown in FIG. 22. The two sensors 2201 and 2202 send the first signal to amplifying circuits 2203 and 2204, respectively. The second signal from the amplifying circuit 2203 is sent into a first comparator 2207 and a second comparator 2208, and the second signal from the amplifying circuit 2204 is sent into a first comparator 2209 and a second comparator 2210. The references for comparators 2207 to 2210 are $V_{H1}$, $V_{L1}$, $V_{H2}$ and $V_{L2}$, respectively. Output signals from comparators 2207 to 2210 are coupled into terminals $H_1$, $L_1$, $H_2$, and $L_2$ of the first logic circuit 2211, respectively. In this embodiment, the terminals $H_1$ and $L_1$ forms a pair of first input terminals, and the terminals $H_2$ and $L_2$ forms another pair of first input terminals. The first logic circuit 2211 includes first output terminals Out00, Out01, Out10 and Out11.

Figure 23:
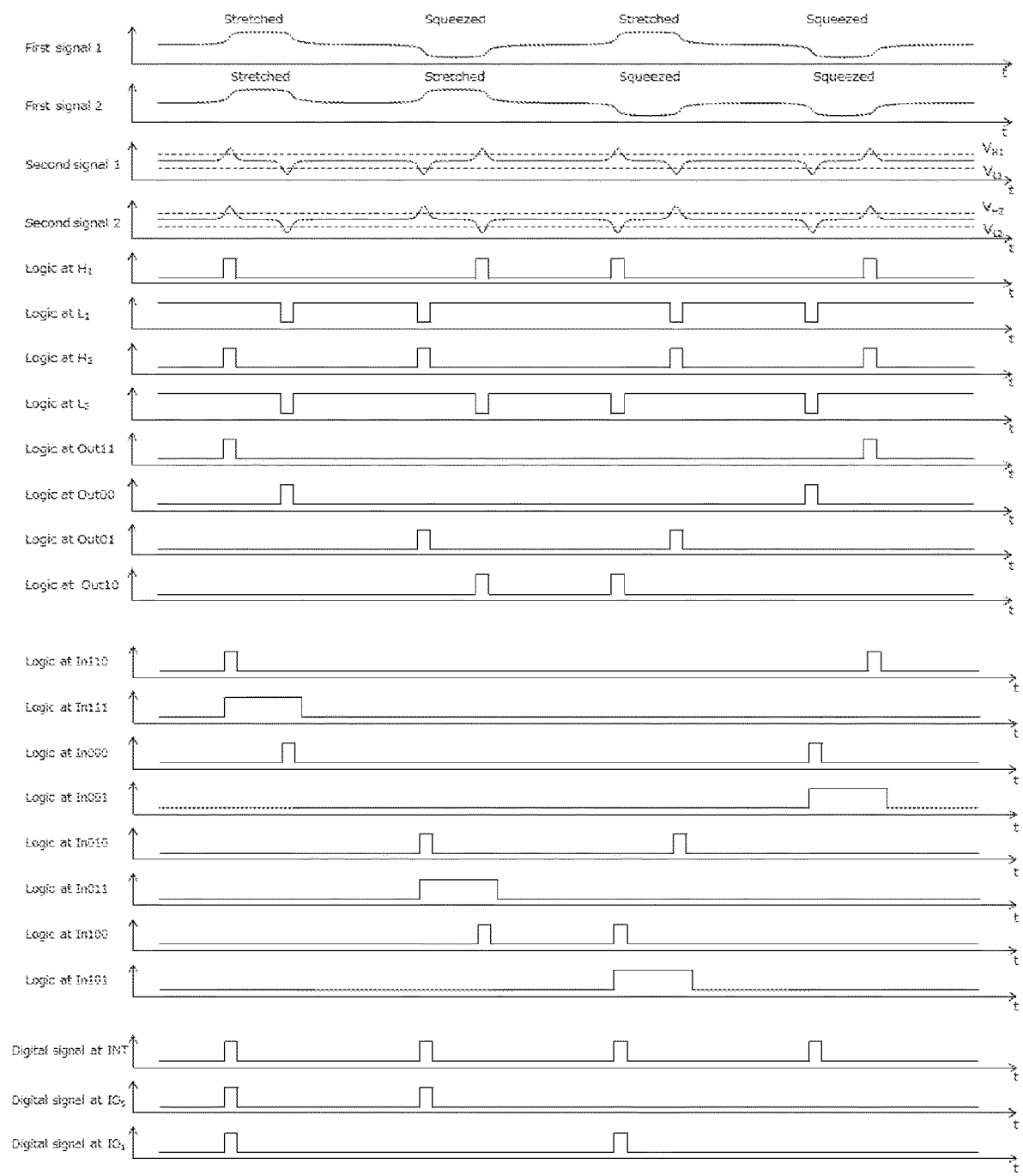
FIG. 23 is a graph of waveforms of signals in an input apparatus according to another embodiment of the present disclosure.

FIG. 23 shows waveforms corresponding to signals in FIG. 22. Out00 corresponds to a combination of terminals $L_1$ and $L_2$. The signal at Out00 is active in response to both the signals at $L_1$ and $L_2$ being active. Out01 corresponds to a combination of terminals $L_1$ and $H_2$. The signal at Out01 is active in response to both the signals at $L_1$ and $H_2$ being active. Out10 corresponds to a combination of terminals $H_1$ and $L_2$. The signal at Out10 is active in response to both the signals at $H_1$ and $L_2$ being active. Out11 corresponds to a combination of terminals $H_1$ and $H_2$. The signal at Out11 is active in response to both the signals at $H_1$ and $H_2$ being active. It is appreciated that although the signals at $L_1$ and $L_2$ are low-level active while other signals are high-level active in FIG. 23, the present disclosure is not limited thereto. Any signal may be low-level active or high-level active based on a requirement of circuits.

The second logic circuit 2216 includes four pairs of second input terminals, namely, In000 and In001, In010 and In011, In100 and In101, and In110 and In111. The signals at Out00, Out01, Out10 and Out11 are coupled into terminals In000, In010, In100 and In110, respectively. Further, the terminals Out00, Out01, Out10 and Out11 correspond to delays 2212, 2213, 2214 and 2215, respectively. Thereby, the signals at Out00, Out01, Out10 and Out11 are further coupled into terminals In001, In011, In101 and In111, respectively, via the corresponding delay.

The second logic circuit 2216 includes three second output terminals coupled to the terminals INT, $IO_0$ and $IO_1$, respectively, of the controller 2206. The signal at INT is active within a corresponding delay period in response to any signal at In001, In011, In101 or In111 turning active. The signal at $IO_0$ is active within a corresponding period in response to any signal at In111 or In011 turning active. The signal at $IO_1$ is active within a corresponding period in response to any signal at In111 or In101 turning active. Hence, as shown in FIG. 23, the controller recognizes a combination of stretches or squeezes detected by the two sensors as follows. Both sensors detect a stretch in a case that the signals at INT, $IO_0$ and $IO_1$ are active. Sensor 2201 detects a squeeze and sensor 2202 detects a stretch, in a case that the signals at INT and $IO_0$ are active and the signal at $IO_1$ is inactive. Sensor 2201 detects a stretch and sensor 2202 detects a squeeze, in a case that the signals at INT and $IO_1$ are active and the signal at $IO_0$ is inactive. Both sensors detect a squeeze in a case that the signal at INT is active and the signals at $IO_0$ and $IO_1$ are inactive. It is appreciated that the above relationship is merely an example of the second logic circuit. The second logic circuit may be configured in other manners. As an example, an output signal at each second output terminal is triggered to be active within the delay period in response to a signal at one or more of the second input terminals turning active. As long as the second output terminals can output different patterns of the digital signal in response to different combinations of status of the sensors, the controller is capable to recognize different inputting operations corresponding to such status of the sensors.

It is noted that 4 delays are provided in this embodiment, among which two delays 2212 and 2213 are provided for the complementary first output terminals Out00 and Out11, and another two delays 2214 and 2215 are provided for the complementary first output terminals Out01 and Out10. Providing two delays for the complementary pair of first output terminals could ensure a signal at one first output terminal would not acts as a trigger for a delay period after a signal at the other first output terminal turns active. Hence, it can be appreciated from that one of the two delays may be removed. For example, in a case that the delay 2212 is removed, the second input terminal In111 is also removed, and the signal at In111 turning active is replaced with the signal at Out11 turning active in the conditions to trigger INT, $IO_1$ and $IO_2$. As an alternative, in a case that the delay 2213 is removed, the second input terminal In001 is also removed, and the signal at In001 turning active is replaced with the signal at Out00 turning active in the conditions to trigger INT, $IO_1$ and $IO_2$. Similarly, one of the delays 2214 and 2215 may be removed without hindering the function as shown in FIG. 23.

Figure 24:
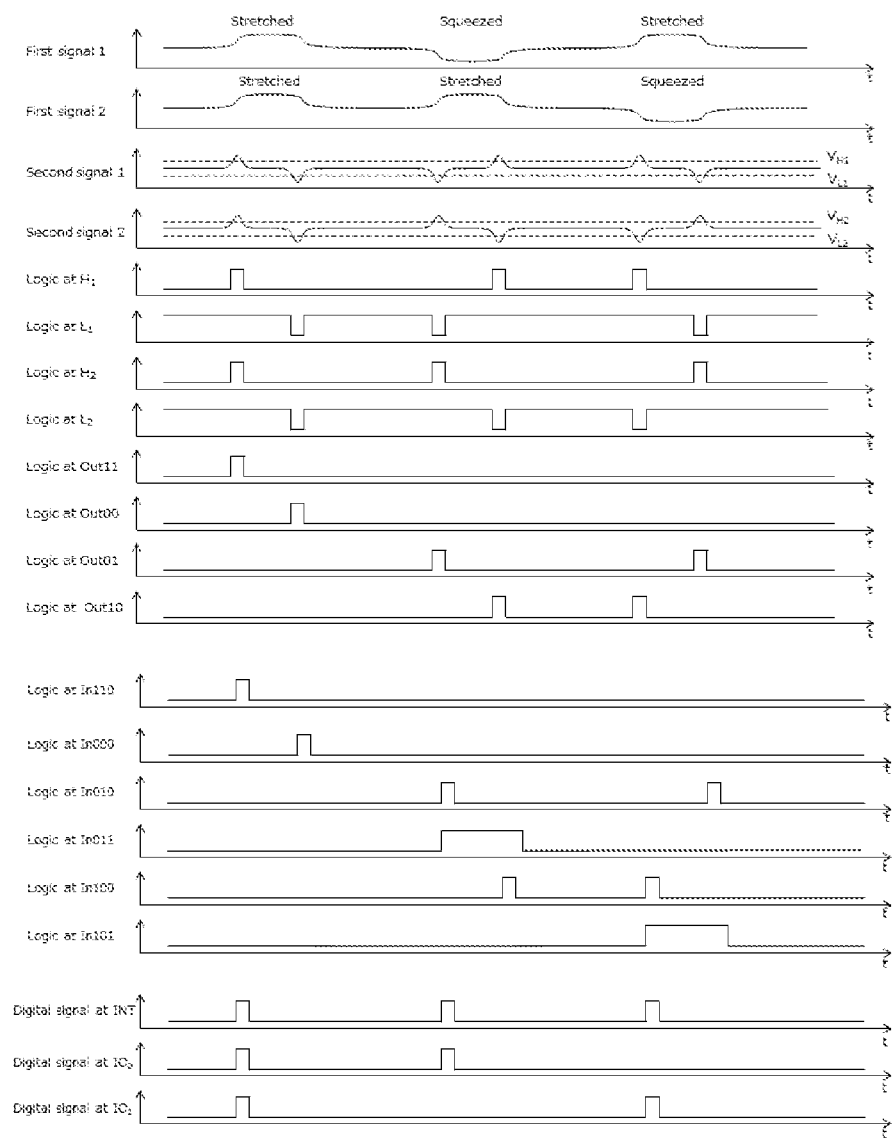
FIG. 24 is a graph of waveforms of signals in an input apparatus according to another embodiment of the present disclosure

It is further noted that the ADC circuit may be simplified based on actual requirements. As an example, one of the inputting operations described in FIG. 23 may not occur in the electronic device due to specific configurations of the sensors. In one embodiment, the input apparatus merely needs to recognize three inputting operations, because the parts of the housing corresponding to two sensors 2201 and 2202 in FIG. 22 would not be simultaneously squeezed. Therefore, the last combination of second signals in FIG. 22, namely, both are a valley followed by a peak, would not occur. In such case, the signal at Out11 does not interfere with the signal at Out00, which means there is no need to compose a latching mode between them. Hence, the delays 2212 and 2213 in FIG. 12 are dispensable, and the second input terminals In111 and In001 are also dispensable. The signal at INT is active within a corresponding delay period in response to any signal at In011 or In101 turning active, and is active in response to the signal at In110 being active. The signal at $IO_0$ is active within a corresponding period in response to any signal at In110 or In011 turning active. The signal at $IO_1$ is active within a corresponding period in response to the signal at In101 turning active, and active in response to the signal at In110 being active. Detailed waveforms are as shown in FIG. 24.

It is appreciated that the configuration of the second output terminals in above embodiments are exemplary, and the present disclosure is not limited thereto. Other configurations may be appropriate under proper logic in the second logic circuit, as long as the digital signals have different patterns for different inputting operations.

It is further appreciated that the inputting operations are not limited to squeezes and stretches at the sensors. Other inputting operations are also appropriate, as long as they could generate similar first signals via the sensors.

An electronic device is further provided according to an embodiment of the present disclosure. The electronic includes any of the input apparatuses as described above, and a controller for recognizing an inputting operation from the digital signal outputted by the input apparatus.

The embodiments of the present disclosure are described in a progressive manner, and each embodiment places emphasis on the difference from other embodiments. Therefore, one embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. An input apparatus, applied to an electronic device, comprising:
    at least one sensor, configured to detect an inputting operation, and output a first signal based on the inputting operation;
    at least one amplifying circuit, configured to amplify a difference between the first signal and a referential signal to output a second signal, wherein each of the at least one amplifying circuit comprises a plurality of stages, each of the plurality stages comprises an amplifier, and a high-pass filter is connected between last two stages of the plurality of stages; and
    an analog-digital converter (ADC), configured to convert the second signal into a digital signal characterizing a state of the inputting operation, wherein the ADC comprises at least one comparator, wherein a last stage of the plurality of stages comprises a first branch that has a variable resistance, the first branch is connected between an output terminal of the amplifier of the last stage and an inverting input terminal of the amplifier of the last stage.

2. The input apparatus according to claim 1, wherein the inputting operation comprises deformation of a part of a housing of the electronic device.

3. The input apparatus according to claim 2, wherein the state of the inputting operation comprises the part of the housing being stretched or being squeezed.

4. The input apparatus according to claim 1, wherein the at least one sensor comprises a strain gauge and a first resistor that are connected in series, and the first signal is a voltage at a common node between the strain gauge and the first resistor.

5. The input apparatus according to claim 1, wherein the high-pass filter comprises a second resistor and a first capacitor that are connected in series.

6. The input apparatus according to claim 1, wherein the first branch comprises a third resistor and a second branch that are connected in parallel, and the second branch comprises a fourth resistor and a first switch that are connected in series.

7. The input apparatus according to claim 1, wherein:
the at least one comparator comprises at least one first comparator or at least one second comparator;
for each of the at least one first comparator, an output signal of said first comparator is active in response to the second signal sent into said first comparator being larger than a reference for said first comparator; and
for each of the at least one second comparator, an output signal of said second comparator is active in response to the second signal sent into said second comparator being smaller than a reference for said second comparator.

8. The input apparatus according to claim 7, wherein the digital signal comprises the output signal of each of the at least one first comparator or the output signal of each of the at least one second comparator.

9. The input apparatus according to claim 7, wherein:
the input apparatus further comprises a logic circuit;
the at least one comparator comprises the at least one first comparator and the at least one second comparator;
the at least one first comparator comprises a primary first comparator, and the at least second comparator comprises a primary second comparator;
the output signal of the primary first comparator is coupled to a first input terminal of the logic circuit, and is coupled via a first delay to a second input terminal of the logic circuit;
the output signal of the primary second comparator is coupled to a third input terminal of the logic circuit, and is coupled via a second delay to a fourth input terminal of the logic circuit;
an output signal of the first delay is kept active for a first period in response to the output signal of the primary first comparator being active, and an output signal of the second delay is kept active for a second period in response to the output signal of the primary second comparator being active;
the output signal of the first delay is forced inactive in response to the output signal of the second delay being active, and the output signal of the second delay is forced inactive in response to the output signal of the first delay being active;
each of at least one output signal of the logic circuit is triggered to be active within the first period in response to the output signal of the primary first comparator turning active, or triggered to be active within the second period in response to the output signal of the primary second comparator turning active; and
the digital signal comprises the at least one output signal of the logic circuit, or the digital signal is generated from the at least one output signal of the logic circuit.

10. The input apparatus according to claim 9, wherein:
the logic circuit outputs the at least one output signal that comprises a first output signal and a second output signal;
the first output signal is triggered to be active within the first period in response to the output signal of the primary first comparator turning active, and the second output signal is triggered to be active within the second period in response to the output signal of the primary second comparator turning active; and
the digital signal comprises the first output signal and the second output signal.

11. The input apparatus according to claim 10, wherein:
the first output signal is active in response to the output signal of the primary first comparator being active, and the second output signal is active in response to the output signal of the primary second comparator being active; or
the first output signal is active in response to the output signal of the primary second comparator being active within the first period after the output signal of the primary first comparator being active, and the second output signal is active in response to the output signal of the primary first comparator being active within the second period after the primary second comparator being active; or
the first output signal is active in response the output signal of the first delay being active, and is inactive in response to the output signal of the first delay being inactive or the output signal of the primary second comparator being active; and the second output signal is active in response to the output signal of the second delay being active, and is inactive in response to the output signal of the second delay being inactive or the output signal of the primary first comparator being active.

12. The input apparatus according to claim 10, wherein the digital signal further comprises the output signal of a comparator other than the primary first comparator and the primary second comparator among the at least one comparator.

13. The input apparatus according to claim 9, wherein:
the ADC further comprises an analog-digital converting unit;
the analog-digital converting unit generates the digital signal, based on the at least one output signal of the logic circuit and the second signal; and
the digital signal comprises an output signal of the analog-digital converting unit.

14. The input apparatus according to claim 7, wherein:
the input apparatus further comprises a logic circuit;
the at least one comparator comprises the at least one first comparator and the at least one second comparator;
the at least one first comparator comprises a primary first comparator and an auxiliary first comparator, and the at least second comparator comprises a primary second comparator and an auxiliary second comparator;
the output signal of the primary first comparator is coupled via a first delay to a first input terminal of the logic circuit, the output signal of the primary second comparator is coupled via a second delay to a second input terminal of the logic circuit, the output signal of the auxiliary first comparator is coupled to a first input terminal of the logic circuit, and the output signal of the auxiliary second comparator is coupled to a fourth input terminal of the logic circuit;

an output signal of the first delay is kept active for a first period in response to the output signal of the primary first comparator being active, and an output signal of the second delay is kept active for a second period in response to the output signal of the primary second comparator being active;

the output signal of the first delay is forced inactive in response to the output signal of the second delay being active, and the output signal of the second delay is forced inactive in response to the output signal of the first delay being active;

each of at least one output signal of the logic circuit is triggered to be active within the first period in response to the output signal of the primary first comparator turning active, or triggered to be active within the second period in response to the output signal of the primary second comparator turning active; and the digital signal comprises the at least one output signal of the logic circuit, or the digital signal is generated from the at least one output signal of the logic circuit.

15. The input apparatus according to claim 14, wherein:
the references for the primary first comparator and the auxiliary first comparator are different, or the references for the primary second comparator and the auxiliary second comparator are different.

16. The input apparatus according to claim 7, wherein:
a quantity of the at least one first comparator is more than one, and the reference for the at least one first comparator are different, or
a quantity of the at least one second comparator is more than one, and the references for the at least one second comparator are different.

17. The input apparatus according to claim 7, wherein:
a quantity of the at least one sensor is N, a quantity of the at least one amplifying circuit is N, a quantity of the at least one first comparator is N, a quantity of the at least one second comparator is N, and N is an integer greater than 1;

the ADC further comprises $2^{N-1}$ delays, wherein others of the $2^{N-1}$ delays is inactive in response to any of the $2^{N-1}$ delays being active;

the ADC further comprises a first logic circuit and a second logic circuit, the first logic circuit comprises N pairs of first input terminals and $2^N$ first output terminals, and the second logic circuit comprises $2^{N-1}$ triples of second input terminals and a plurality of second output terminals;

there is a one-to-one correspondence between the N sensors and the N amplifying circuits, between the N amplifying circuits and the N first comparators, between the N amplifying circuits and the N second comparators, and between the N amplifying circuits and the N pairs of first input terminals;

for each of the N amplifying circuits, the first signal outputted by the corresponding sensor is amplified, said first signal is coupled to the corresponding first comparator and the corresponding second comparator, and the output signal of said first comparator is coupled to one first input terminal in the corresponding pair of the first input terminals, and the output signal of said second comparator is coupled to another first input terminal in the corresponding pair of the first input terminals;

for each of the $2^N$ first output terminals, an output signal of said first output terminal is active in response to signals at a combination of N of the first input terminals being active, each of the N first input terminals belongs to a different one of N pairs of the first input terminals, and the combinations for the $2^N$ first output terminals are different from each other;

the $2^N$ first output terminals is divided into $2^{N-1}$ pairs of first output terminals, wherein in each pair of first output terminals, the two combinations for said pair of first output terminals comprise every first input terminal of the N pairs of first input terminals;

there is a one-to-one correspondence between the $2^{N-1}$ pairs of first output terminals and the $2^{N-1}$ delays, and between the $2^{N-1}$ pairs of first output terminals and the $2^{N-1}$ triples of second input terminals;

for each of the $2^{N-1}$ pairs of first output terminals, one of said pair of first output terminal is coupled to one second input terminal in the corresponding triple of second input terminals, the one of said pair of first output terminal is coupled via the corresponding delay to another second input terminal in the corresponding triple of second input terminals, another of said pair of first output terminals is coupled to yet another second input terminal in the corresponding triple of second input terminals, and an output signal of the corresponding delay is active for a period in response to the output signal of the one of said pairs of first output terminal being active;

for each of the plurality of second output terminals, an output signal of said second output terminal is triggered to be active within the period in response to an output signal from one or more of the $2^N$ first output terminals turning active; and the digital signal comprises the output signals of the plurality of second output terminals, or the digital signal is generated from the output signals of the plurality of second output terminals.

18. The input apparatus according to claim 7, wherein:
the at least one sensor comprises a first sensor and a second sensor, the at least one amplifying circuit comprises a first amplifying circuit and a second amplifying circuit, the at least one first comparator comprises a primary first comparator and an auxiliary first comparator, and the at least one second comparator comprises a primary second comparator and an auxiliary second comparator;

the first sensor outputs a first channel of the first signal to the first amplifying circuit, the second sensor outputs a second channel of the first signal to the second amplifying circuit, the first amplifying circuit outputs a first channel of the second signal to the primary first comparator and the primary second comparator, and the second amplifying circuit outputs a second channel of the second signal to the auxiliary first comparator and the auxiliary second comparator;

the ADC further comprises a first delay and a second delay, wherein the first day is forced inactive in response to the second delay being active, the second delay is forced inactive in response to the first delay being active, an output signal of the first delay is active for a first period in response to an input signal of the first day being active, and an output signal of the second delay is active for a second period in response to an input signal of the second day being active;

the ADC further comprises a first logic circuit and a second logic circuit, the first logic circuit comprises a first input terminal, a second input terminal, a third input terminal, a fourth input terminal, a first output terminal, a second output terminal, a third output terminal, and a fourth output terminal, and the second logic circuit comprises a fifth input terminal, a sixth input terminal, a seventh input terminal, an eighth input terminal, a ninth input terminal, a tenth input terminal, and a plurality of digital output terminals;

the output signal of the auxiliary first comparator is coupled to the first input terminal, the output signal of the auxiliary second comparator is coupled to the second input terminal, the output signal of the primary first comparator is coupled to the third input terminal, and the output signal of the primary second comparator is coupled to the fourth input terminal;

an output signal of the first output signal is active in response to signals at the first input terminal and the third input terminal being active, an output signal of the second output signal is active in response to signals at the second input terminal and the fourth input terminal being active, an output signal of the third output signal is active in response to signals at the second input terminal and the third input terminal being active, and an output signal of the fourth output signal is active in response to signals at the first input terminal and the fourth input terminal being active;

the first output terminal is coupled to the fifth input terminal, the second output terminal is coupled to the sixth input terminal, the third output terminal is coupled to the seventh input terminal, the third output terminal is coupled to the eighth input terminal via the first delay, the fourth output terminal is coupled to the ninth input terminal, and the fourth output terminal is coupled to the tenth input terminal via the second delay;

for each of the plurality of digital output terminals, conditions for triggering an output signal of said second output terminal to be active comprises at least one of:

an output signal from the first output terminal being active;

an output signal from the second output terminal being active;

being within the first period after an output signal from the third output terminal turning active; or being within the second period after an output signal from the fourth output terminal turning active; and the digital signal comprises the output signals of the plurality of second digital output terminals, or the digital signal is generated from the output signals of the plurality of second digital output terminals.

19. The input apparatus according to claim 1, wherein the difference is not amplified in response to the difference being smaller than an offset of a first one of the multiple stages.

* * * * *